(12) United States Patent
Okada et al.

(10) Patent No.: US 6,889,793 B2
(45) Date of Patent: May 10, 2005

(54) FOUR WHEEL-DRIVE VEHICLE

(76) Inventors: Hideaki Okada, 2-18-1, Inadera, Amagasaki-shi, Hyogo (JP); Michio Tsukamoto, 2-18-1, Inadera, Amagasaki-shi, Hyogo (JP); Robert Abend, 101 International Pkwy., P.O. Box 289, Adairsville, GA (US) 30103

( * ) Notice: Subject to any disclaimer, the term of this patent is extended or adjusted under 35 U.S.C. 154(b) by 0 days.

(21) Appl. No.: 10/688,924

(22) Filed: Oct. 21, 2003

(65) Prior Publication Data

US 2004/0134704 A1 Jul. 15, 2004

Related U.S. Application Data

(63) Continuation-in-part of application No. 10/277,115, filed on Oct. 22, 2002, now Pat. No. 6,732,828.

(51) Int. Cl.$^7$ .............................................. B60K 17/34
(52) U.S. Cl. ....................... 180/435; 180/420
(58) Field of Search ................. 180/233, 235, 180/417, 418, 420

(56) References Cited

U.S. PATENT DOCUMENTS

| 3,151,694 | A | * | 10/1964 | Rogers | 180/6.32 |
| 3,342,282 | A | * | 9/1967 | Forpahl | 180/235 |
| 4,042,053 | A | * | 8/1977 | Sieren et al. | 180/236 |
| 4,947,956 | A | * | 8/1990 | Henline | 180/235 |
| 5,979,270 | A |   | 11/1999 | Thoma et al. |   |
| 6,189,641 | B1 |   | 2/2001 | Azuma |   |
| 6,267,163 | B1 | * | 7/2001 | Holmes | 144/336 |
| 6,425,452 | B1 | * | 7/2002 | Steiner et al. | 180/233 |
| 6,732,828 | B1 | * | 5/2004 | Abend et al. | 180/242 |
| 2001/0001187 | A1 |   | 5/2001 | Yano et al. |   |
| 2002/0189251 | A1 |   | 12/2002 | Thoma et al. |   |

FOREIGN PATENT DOCUMENTS

| JP | 62198570 A | * | 9/1987 | ........... B62D/53/02 |
| JP | 2000-270651 |   | 10/2000 |   |

* cited by examiner

*Primary Examiner*—Kevin Hurley
(74) *Attorney, Agent, or Firm*—Sterne, Kessler, Goldstein and Fox P.L.L.C.

(57) ABSTRACT

An articulate vehicle comprises a first frame disposed at one of front and rear portions of the vehicle and a second frame disposed at the other of front and rear portions of the vehicle. The first frame supports a first transaxle apparatus supporting a first axle. The second frame supports a second transaxle apparatus supporting a second axle. Proximal ends of the frames with respect to the vehicle are coupled to each other through a coupling part so that the first and second frames are rotatable relative to each other around a vertical axis according to steering operation. An engine is mounted on the first frame. A first hydraulic motor is integrally assembled in the first transaxle apparatus so as to drive the first axle. A working vehicle is equipped at a distal side of the second frame with respect to the vehicle. A second hydraulic motor is integrally assembled in the second transaxle apparatus so as to drive the second axle. A hydraulic pump is mounted on either the first or second frame, drivingly connected to the engine, and fluidly connected to both the first and second hydraulic motors.

10 Claims, 27 Drawing Sheets

FOUR WHEEL-DRIVE VEHICLE

BACKGROUND OF THE INVENTION

1. Field of the Invention

The invention relates to a four-wheel-drive vehicle, particularly to a four-wheel drive articulate working vehicle such as a riding lawn mower. More particularly, it relates to a structure of a transaxle apparatus in the vehicle, and a structure for drivingly connecting front and rear transaxle apparatuses in the vehicle to each other.

2. Related Art

Conventionally, there is a well-known articulate riding lawn mower with pivotally connected first and second frames so as to allow the second frame to be folded relative to the first frame around a vertical axial pivot by steering operation (i.e., manipulation of a steering wheel). The first frame is equipped with an engine and a transaxle apparatus supporting a first axle driven by the engine. The second frame is equipped with a working device such as a mover device, a driver's unit, and an axle casing supporting a freely rotatable second axle. Furthermore, a riding lawn mower provided with an Ackerman type steering system is also well known.

For example, the Japanese Patent Laid Open Gazette 2000-270,651 discloses an articulate four-wheeled lawn mower in which the first frame serves as a rear frame and the second frame serves as a front frame. The rear frame is provided with an HST (a hydrostatic transmission) for transmitting engine power to rear wheels supported by the rear frame. Also, the rear frame is provided with a power take-off shaft for taking out power from a pump shaft of a hydraulic pump of the HST so as to transmit the rotation of the power take-off shaft to a mower device supported by the front frame.

Furthermore, as well known from Japanese Laid Open Gazette Sho. 63-42616, for example, some articulate vehicles have such a feature that the first and second frames differ in length and the first and second axles are unequally distant from the pivot in correspondence of the length difference between the frames.

Each of the above-mentioned conventional vehicles is a two-wheel drive vehicle, in which the second axle supported by the axle casing on the second frame (usually serving as a front frame) rotates freely from the engine power driving the first axle supported by the transaxle apparatus of the first frame (usually serving as a rear frame).

The two-wheel-drive vehicle driving only rear wheels is advantageous in steering performance, however, it lacks stability when working on a slope and road ability when running on a bad road. Moreover, the vehicle mired in mud or the like is difficult to bail out.

As a conceivable manner for solving the problem, a four-wheel drive articulate vehicle may be provided. However, in the above-disclosed vehicle including the rear frame on which the engine, the HST and the power take-off shaft are mounted, the power take-off shaft is rotated synchronously to rotation of the pump shaft so that the rotary speed of the power take-off shaft is constant as long as the rotary speed of the engine is constant, while the rotary speed of the rear wheels driven by output of the hydraulic motor is changed by speed change operation for adjusting a swash plate angle of the hydraulic pump. Thus, the power take-off shaft for driving the working device cannot be used as a front-wheel drive shaft simply. Even if another power take-off shaft is allowed to be provided in the transaxle apparatus on the rear frame so as to take out output power of the HST and to drive the front wheels synchronously to the rear wheels, there is considerable limitation in arrangement of a mechanical transmission system between the transaxle apparatuses on the front and rear frames because it is necessary to ensure the rotatability of both the frames and to arrange the transmission system for driving the working device in the place. The four-wheel drive articulate vehicle disclosed by U.S. Pat. No. 6,425,452, in which both the transaxle apparatuses on the respective first and second frames incorporate respective HSTs, is very expensive and requires both the HSTs to be controlled synchronously.

Further, the front and rear axles of the above-disclosed four-wheel-drive articulate working vehicle of the U.S. Pat. No. '452 are equally distant from the pivot between the front and rear frames so that the vehicle may turn smoothly without dragging any of front and rear wheels by keeping a constant relative velocity between the first and second axles whether the vehicle goes straight or turns.

However, if the above-disclosed articulate working vehicle of the Japanese Document '616 having the front and rear axles being unequally distant from the pivot between the front and rear frames is simply made into a four-wheel drive vehicle, a ratio of a distance between one axle and a turning circle center of the vehicle to a distance of the other axle from the center varies along with variation of steering operation degree (the steering wheel angle). Therefore, a constant relative velocity between the front and rear axles kept whether the vehicle travels straight or turns causes that either front wheels or rear wheels are dragged so as to prevent the vehicle from smooth turning.

Consequently, the four-wheel-drive articulate working vehicle with the first and second axles being equally distant from the pivot between the first and second frames can not turn smoothly unless the relative velocity between the first and second axles, the steering degree (the steering wheel angle), the turning angle of the vehicle (the angle difference between the first and second axles), and the turning circle center of the vehicle are well associated.

BRIEF SUMMARY OF THE INVENTION

A first object of the present invention is to provide a four-wheel drive vehicle with high flexibility of parts arrangement depending upon hydraulic piping serving as transmission means between front and rear transaxle apparatuses standardized for saving costs.

To achieve the object, a vehicle according to the invention comprises a first transaxle apparatus disposed at one of front and rear portions of the vehicle, a first axle supported by the first transaxle apparatus, a first hydraulic motor for driving the first axle integrally assembled in the first transaxle apparatus, a second transaxle apparatus at the other of front and rear portions of the vehicle, a second axle supported by the second transaxle apparatus, a second hydraulic motor for driving the second axle integrally assembled in the second transaxle apparatus, and a common variable displacement hydraulic pump drivingly connected to an engine and fluidly connected to the first and second hydraulic motors.

Preferably, the vehicle is a riding lawn mower.

Preferably, the first hydraulic motor of the first transaxle apparatus and the second hydraulic motor of the second transaxle apparatus are fluidly connected to the common hydraulic pump in series.

Preferably, a pair of axles serve as the first axle of the first transaxle apparatus and are differentially connected to each other through a differential gearing, and another pair of axles serve as the second axle of the second transaxle apparatus and are differentially connected to each other through another differential gearing.

Preferably, a differential-lock system is provided in each of the differential gearings so as to cancel the differential rotation of the pair of first axles or of the pair of second axles.

Preferably, a switching valve is interposed on a connection way between the common hydraulic pump and the first hydraulic motor of the first transaxle apparatus so as to control the supply of fluid to the first hydraulic motor.

Preferably, a fluid sump in the first transaxle apparatus, a fluid sump in a second transaxle apparatus, and a fluid sump in the common hydraulic pump are fluidly connected to one another so that hydraulic fluid is circulated among the fluid sumps.

The hydraulic motor is required to prevent output force thereof transmitted to each of the hydraulic motors from being reduced and to constitute a drive train with the corresponding transaxle apparatus compactly.

Then, as an aspect, the hydraulic motors are incorporated in the respective first and second transaxle apparatuses.

In application of a four-wheel drive system to the vehicle, it is desirable to achieve standardization of manufacture parts so as to save the manufacturing costs.

Accordingly, the first and second transaxle apparatuses are identical with each other in structure.

In application of the four-wheel drive system, necessary transmission means for transmitting power to a working device, which is needed in the conventional vehicle, must be modified.

Therefore, a pair of axles serving as the second axle supported by the second transaxle apparatus are different in length from each other, and a transmission element for drivingly connecting the engine to the working device crosses a longer axle of the pair of second axles.

In arrangement of the first and second transaxle apparatuses, it is necessary to consider weight balance of the vehicle.

Consequently, the first and second transaxle apparatuses are identical with each other in shape, and distributed into one side and the other in a lateral direction of the vehicle.

A second object of the present invention is to provide a four-wheel-drive articulate working vehicle having pivotally connected first and second frames and first and second axles supported by the respective first and second frames, the first and second axles being unequally distant from a pivot connecting the first and second frames, wherein, while four wheels on both the first and second axles of the vehicle are driven so as to enhance running efficiency, the vehicle can turn smoothly without dragging any of the four wheels.

To achieve the second object, the four-wheel-drive articulate working vehicle according to the present invention steplessly changes a relative velocity between the first and second axles according to variation of a distance ratio between the first and second axles from the turning circle center of the vehicle while the vehicle is turning. The distance ratio varies according to variation of a turning angle of the vehicle (an angle between the first and second axles).

On the first frame is disposed a hydraulic motor for driving the first axle, and on the second frame are disposed mutually fluidly connected hydraulic motor and variable displacement hydraulic pump, the hydraulic pump being also fluidly connected to the hydraulic motor on the first frame. At least one of the hydraulic motors on the respective first and second frames is a variable displacement motor, whose capacity automatically varies for changing the relative velocity between the first and second axles according to the variation of turning angle of the vehicle.

Due to the above structures, the four-wheel-driving articulate working vehicle, in which the first and second axles are unequally distant from the pivot between the first and second frames, can turn smoothly on a small circle without dragging any of front and rear wheels, and can mow a lawn evenly without damaging the lawn. Moreover, the variation of relative velocity between the first and second axles is automatically linked with turning (bending) of the vehicle, thereby requiring an operator to do no complicated speed-changing operation.

These and other objects, features and advantages of the invention will become more apparent upon a reading of the following detailed description and drawing.

DETAILED DESCRIPTION OF THE INVENTION

Figure 1:
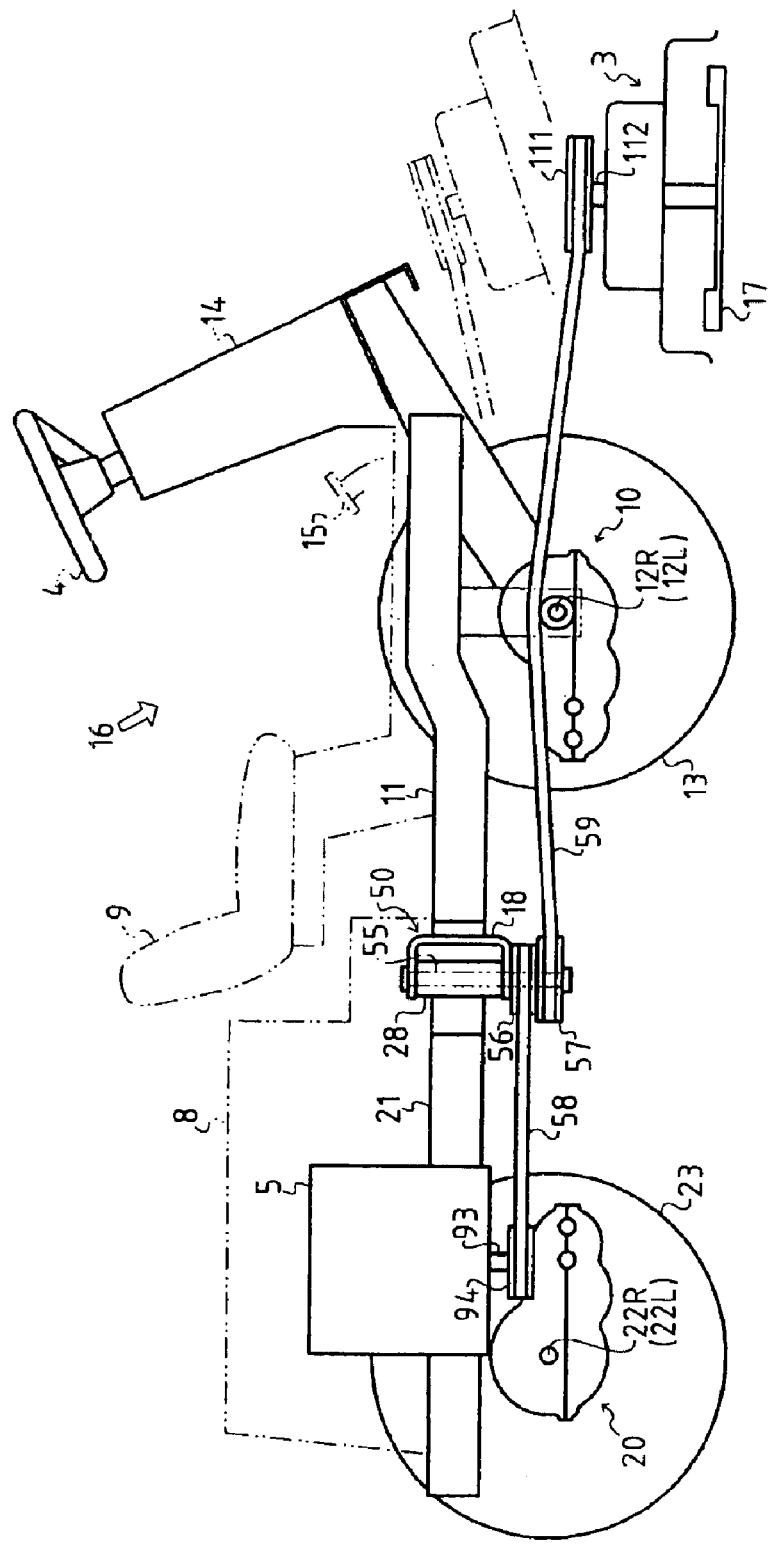
FIG. 1 is a side view of a riding lawn mower as a first embodiment of a four-wheel drive articulate vehicle according to the present invention, wherein front and rear axles are equally distant from a pivot connecting front and rear frames.

To begin with, description will be given of a structure of a riding lawn mower according to a first embodiment of the present invention shown in FIGS. 1 to 9. FIG. 1 shows the riding lawn mower equipped at a front portion thereof with a mower device 3 serving as a working device. A front transaxle apparatus 10 is arranged on a front frame 11, and front wheels 13 are fixed to respective front wheel axles 12L and 12R extended laterally from the front transaxle apparatus 10. On the other hand, a rear transaxle apparatus 20 is arranged to a rear frame 21, and rear wheels 23 are fixed to respective rear wheel axles 22L and 22R extended laterally from the rear transaxle apparatus 20.

At a pivotal coupling part 50, a rear end part of the front frame 11 and a front end of the rear frame 12 are horizontally rotatably coupled to each other so that the rear frame 21 can be laterally folded relative to the front frame 11, thereby constituting an articulate vehicle serving as the riding lawn mower.

An engine 5 is carried in rear frame 21. On the front frame 11 are arranged a steering column 14, a steering wheel 4, a pedal 15, and a seat 9 behind the steering column 14, thereby constituting an operation part 16. The mower device 3 driven by the engine 5 is vertically movably disposed downwardly forward from the operation part 16, i.e., at a distal end of the front frame 11 with respect to the vehicle.

On the rear frame 21 is mounted the engine 5 covered with the bonnet 8. The rear transaxle apparatus 20 is arranged under the engine 5.

Figure 2:
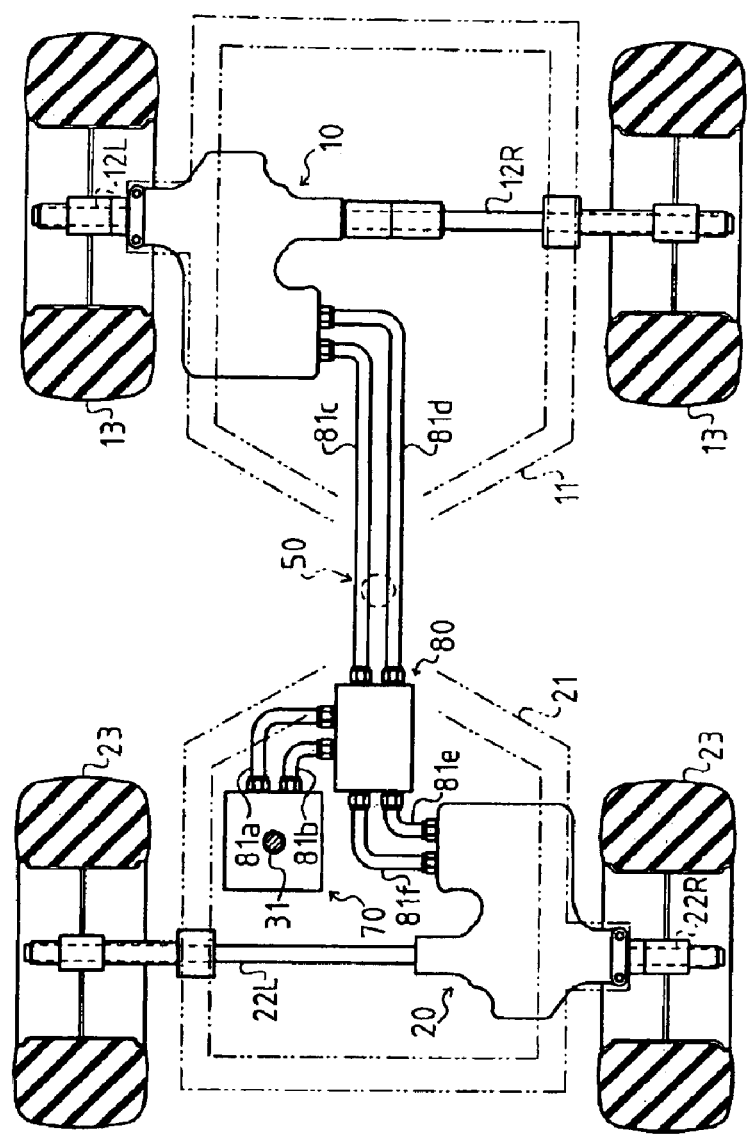
FIG. 2 is a plan view of the vehicle showing arrangement of front and rear transaxle apparatuses 10 and 20.

As shown in FIG. 2, in an initial state of the vehicle (for straight traveling), the rear transaxle apparatus 20 and the front transaxle apparatus 10 are disposed mutually symmetrically with respect to a rotation center of the coupling part 50. More specifically, the front and rear transaxle apparatuses 10 and 20 are identical with each other in shape, and distributed into one side and the other in a lateral direction of the vehicle. The front transaxle apparatus 10 is arranged leftwardly eccentrically on the front wheel axles 12L and 12R, and the rear transaxle apparatus 20 is arranged rightwardly eccentrically on the rear wheel axles 22L and 22R. Alternatively, the front and rear transaxle apparatuses 10 and 20 may be distributed conversely in right and left.

Figure 6:
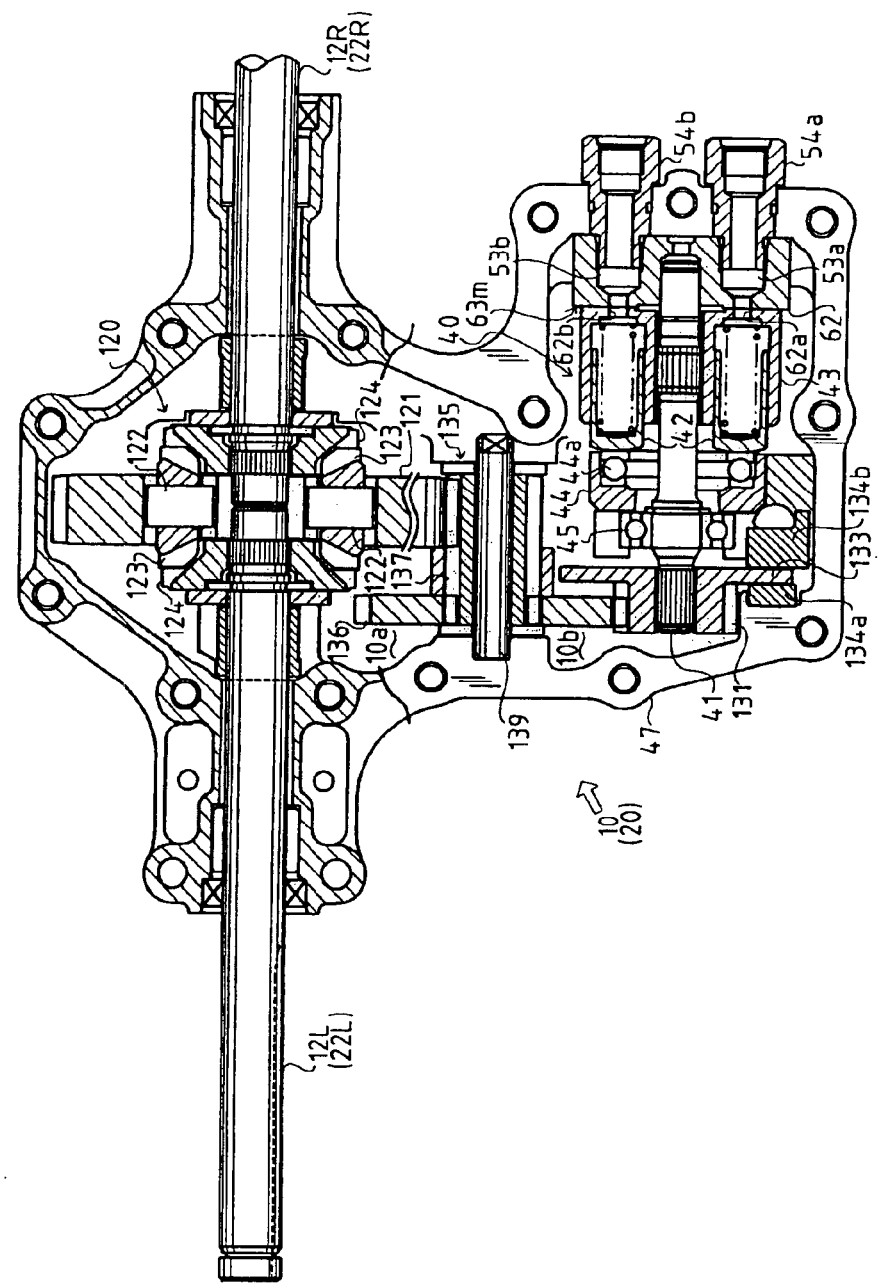
FIG. 6 is a plan view partly in section of a structure which is common to the front and rear transaxle apparatuses 10 and 20.

Each of the front transaxle apparatus 10 and the rear transaxle apparatus 20 has a common structure shown in FIG. 6., in which a hydraulic motor 40 is integrally assembled so as to drive the front wheel axles 12L and 12R or the rear wheel axles 22L and 22R.

Figure 5:
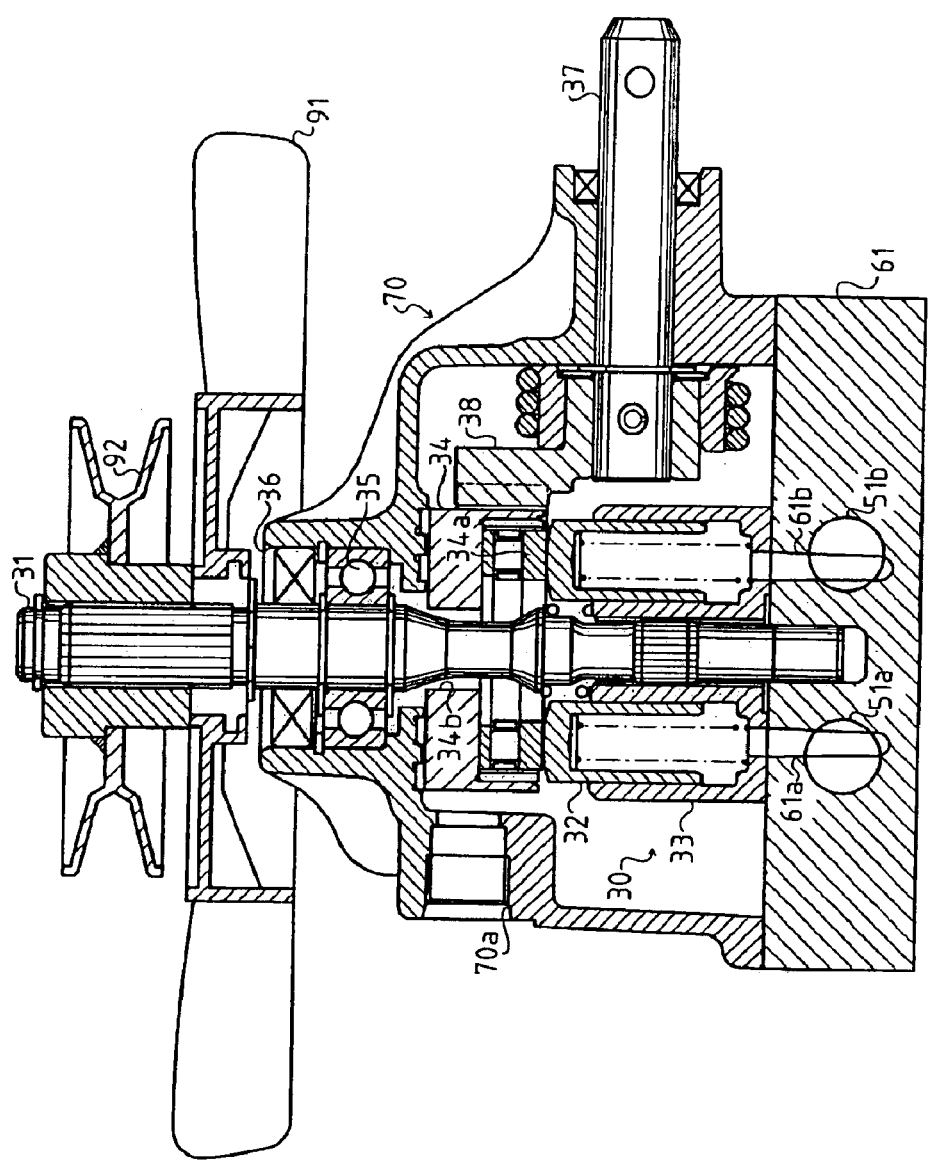
FIG. 5 is an inner side view partly in section of a housing incorporating a hydraulic pump for the transaxle apparatuses.

As shown in FIGS. 2 and 5, a housing 70 which incorporates a hydraulic pump 30 is arranged on the rear frame 21, and a pump center section 61 is disposed in a lower portion of the housing 70. Motor center sections 62 shown in FIG. 6, which are arranged in the front and rear transaxle apparatuses 10 and 20 respectively, are fluidly connected to the pump center section 61 shown in FIG. 5 through a distributor 80 arranged on the rear frame 21 and hydraulic hoses 81a, 81b and etc., as shown in FIG. 2. Alternatively, the housing 70 and the distributor 80 may be arranged on the front frame 11.

Figure 3:
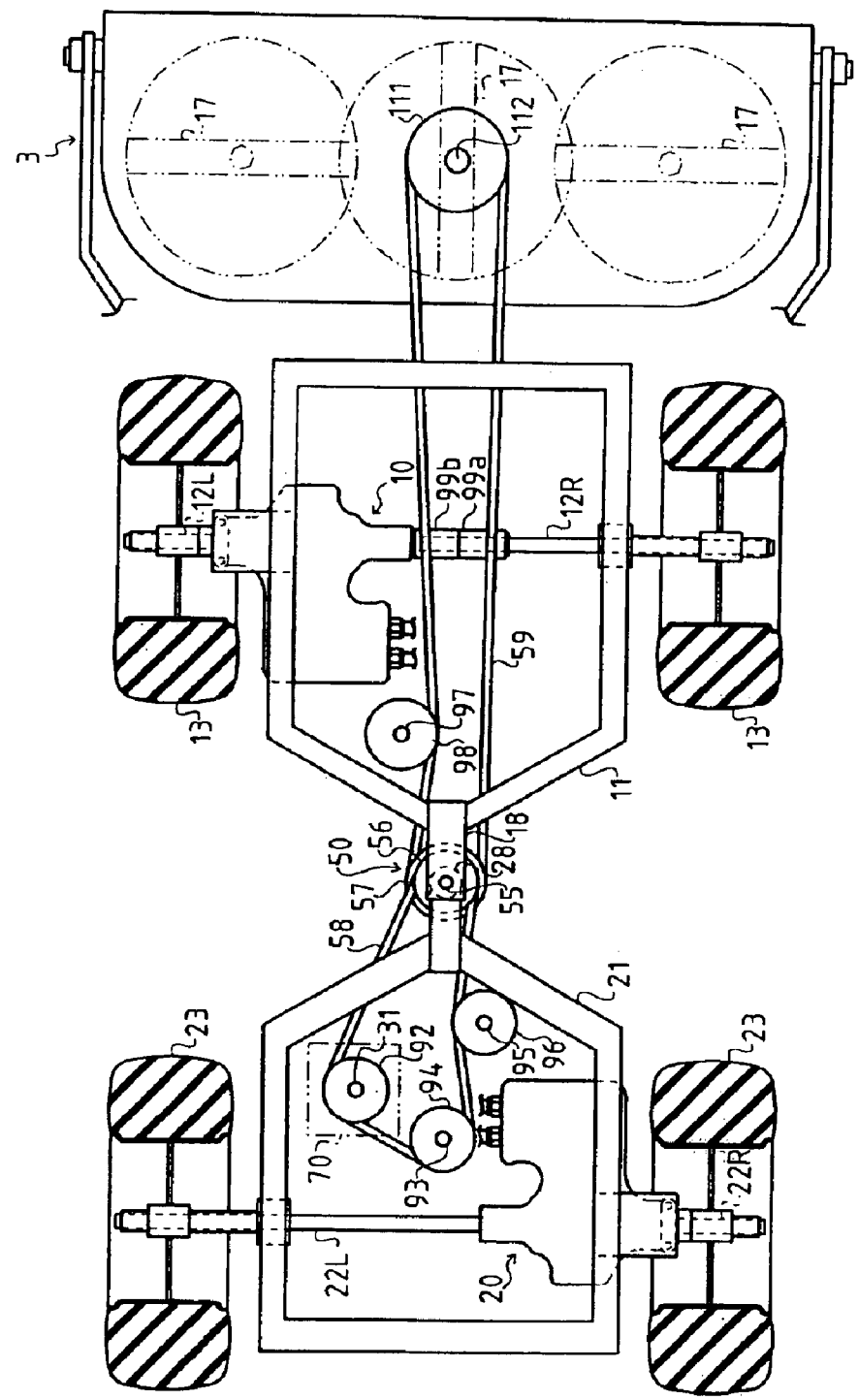
FIG. 3 is a plan view of the vehicle showing a transmission system for driving a working device equipped on the vehicle.

As shown in FIG. 3, at the rear frame 21 side, an engine output pulley 94 is fixed to an output shaft 93 of the engine 5, an HST input pulley 92 is fixed to a pump shaft 31 of the hydraulic pump 30 incorporated in the housing 70, and an idle roller 96 is rotatably supported through a bearing (not shown) by a support shaft 95 hung from the rear frame 21.

On the other hand, at the front frame 11 side, a working device driving power input pulley 111 is fixed to an input shaft 112 of the mower device 3 serving as a working device, and an idle pulley 98 is rotatably supported through a bearing (not shown) by a support shaft 97 hung from the front frame 11.

As shown in FIGS. 1 and 3, regarding the coupling part 50, a cylindrical pivotal coupler 28 which supports a vertical coupling shaft 55 unrotatably is disposed on a laterally middle front end portion of the rear frame 21. On the other hand, a plate pivotal coupler 18, U-like shaped in side view, is disposed on a laterally middle rear end portion of the front frame 11. The coupler 18 is pivotally fitted onto the coupling shaft 55 so as to couple the front and rear frames 11 and 21 to each other, whereby the rear frame 21 can be laterally folded relative to the front frame 11. As mentioned above, couplers 18 and 28 are disposed on respective proximal ends of the front and rear frames 11 and 21 with respect to the vehicle, and are coupled to each other through the coupling shaft 55 so as to constitute the coupling part 50. Thus, both the front and rear frames are coupled so as to be rotatable around the vertical axis of the coupling shaft 55 relative to each other by steering operation (of the steering wheel 4).

A lower portion of the coupling shaft 55 is extended below so as to be rotatably provided thereon with mutually connected input and output pulleys 56 and 57 through bearings (not shown).

As shown in FIG. 3, at the rear frame 21 side is wound a first working-device drive transmission belt 58 around the engine output pulley 94, the HST input pulley 92, the idle roller 96, and the input pulley 56. On the other hand, at the front frame 11 side is wound a second working-device drive transmission belt 59 around an idle roller 98, a working-device driving power input pulley 111, and the output pulley 57.

In this way, engine output power is transmitted to the input pulley 56 through the first working-device drive transmission belt 58 from the engine output pulley 94, thereby rotating the output pulley 57 integrally with the input pulley 56 so as to transmit the power to the working-device driving power input pulley 111 through the second working-device drive transmission belt 59, and thereby rotating the input shaft 112 so as to rotate mowing blades 17.

As shown in FIG. 3, the right front wheel axle 12R is longer than the left front wheel axle 12L so that the front transaxle apparatus 10 extending the axles 12L and 12R is settled at the position shifted leftward from the lateral middle of the front frame 11.

Figure 4:
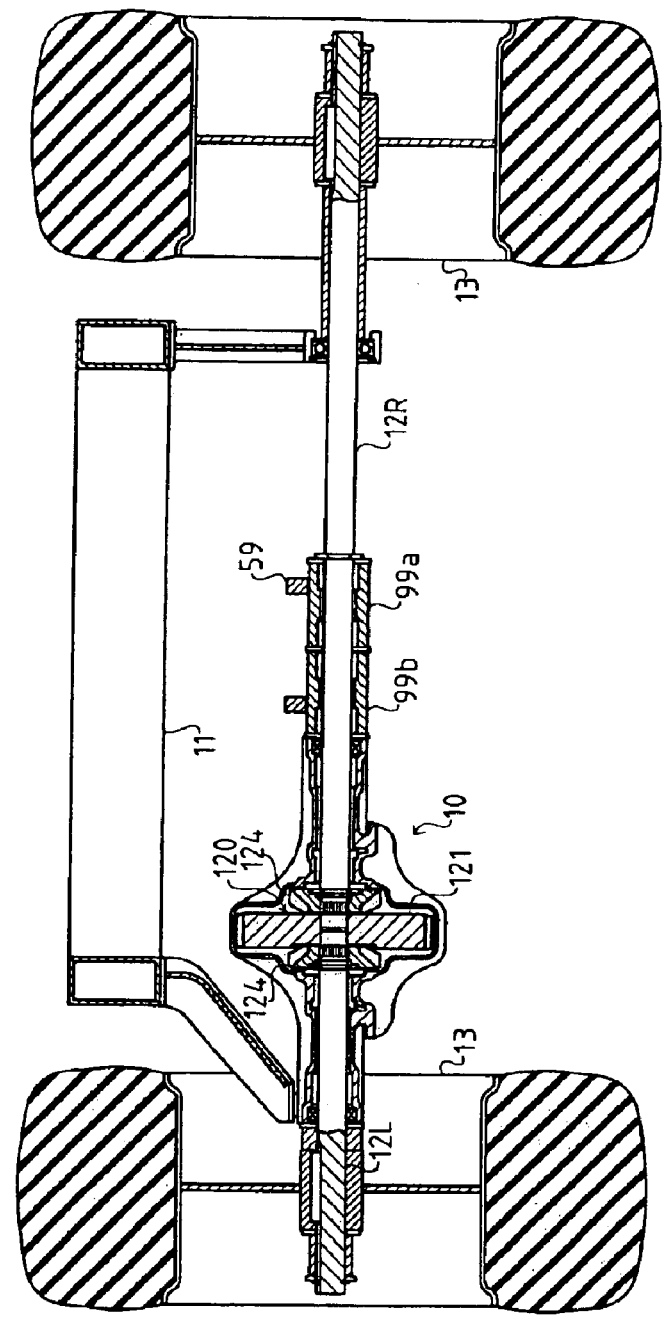
FIG. 4 is a rear view of the front transaxle apparatus 10 arranged between left and right front wheels 13.

As shown in FIGS. 3 and 4, on a portion of the front wheel axle 12R at the substantially lateral middle of the front frame 11 are provided a pair of left and right collars 99a and 99b freely rotatable independently of each other. The second working-device drive transmission belt 59 is allowed to contact at undersurfaces thereof with the respective upper surfaces of the collars 99a and 99b.

Thus, the front transaxle apparatus 10 supports the pair of axles having different lengths, and the second working-device drive transmission belt 59, i.e., the transmission element for drivingly connecting the engine 5 to the mower device 3 serving as a working device crosses the longer axle of the pair of axles and is allowed to contact the longer axle.

As mentioned above, the second working-device drive transmission belt 59 passes through a position higher than the front wheel axle 12R, thereby ensuring a road clearance. Moreover, when the working device 3 is lowered for mowing, the second working-device drive transmission belt 59 is also lowered to the front wheel axle 12R and contacts the collars 99a and 99b. The collars 99a and 99b follow the belt 59 so as to rotate freely relative to the axle 12R while the belt 59 is prevented from directly contacting the axle 12R. Thus, the belt 59 is safe from being damaged by friction.

Alternatively, the front transaxle apparatus 10 may be placed rightwardly eccentrically in the front frame 11. In this case, the rear transaxle apparatus 20 is shifted leftward so as to keep the symmetrical relation of the apparatuses 10 and 20.

Description will now be given of the housing 70 arranged in a rear frame 21. As shown in FIG. 5, the housing 70 is attached and fixed to the upper surface of the pump center section 61. The HST hydraulic pump 30 is disposed in the inside of the housing 70 serving as a fluid sump. The HST hydraulic pump 30 comprises a cylinder block 33 slidably rotatably mounted on an upper pump mounting surface of the pump center section 60. Pistons 32 are reciprocally movably fitted through biasing springs into a plurality of cylinder bores in cylinder block 33. A thrust bearing 34a of a movable swash plate 34 abuts against heads of the pistons 32. An opening 34b is provided; at the center of movable swash plate 34 so as to let a pump shaft 31 perforate therethrough. A control arm 38 engages with a side surface of the movable swash plate 34, so that the tilt angle of the movable swash plate 34 is adjusted by rotating a control shaft 37 serving as a rotary shaft of the control arm 38.

In order that the pump shaft 31 may function as an input shaft and be disposed vertically along the rotary axis of the cylinder block 33, the pump shaft 31 is rotatably supported by a bearing 35 fitted in an opening 36 formed in an upper portion of the housing 70, and is not-relatively rotatably engaged with the cylinder block 33.

Thus, an axial piston type variable displacement hydraulic pump 30 is constructed in the housing 70.

The pump shaft 31 projects outwardly at the upper end thereof from the upper portion of the housing 70. An HST input pulley 92, with a cooling fan 91 below, is fixed onto the upper projecting portion of the pump shaft 31. The HST input pulley 92 receives power from the engine through transmission means so as to rotate the pump shaft 31.

Within the pump center section 61 are bored a pair of kidney-ports 61a and 61b from the upper pump mounting surface, and a pair of horizontal first and second fluid passages 51a and 51b. The kidney-port 61a is connected to the first fluid passage 51a, and the kidney-port 61b to the second fluid passage 51b. Each of the first and second fluid passages 51a and 51b is outwardly open at one end thereof and connected to a connection port (not shown) to be connected to a hydraulic hose.

A feeding-and-discharging port 70a is formed in the upper portion of the housing 70 so as to ensure feeding and discharging of hydraulic fluid between a reservoir tank (not shown) and the fluid sump in the housing 70.

Description will now be given of the front transaxle apparatus 10 and the rear transaxle apparatus 20, referring to only the front transaxle apparatus 10 because both the transaxle apparatuses are integral with each other in structure.

Figure 8:
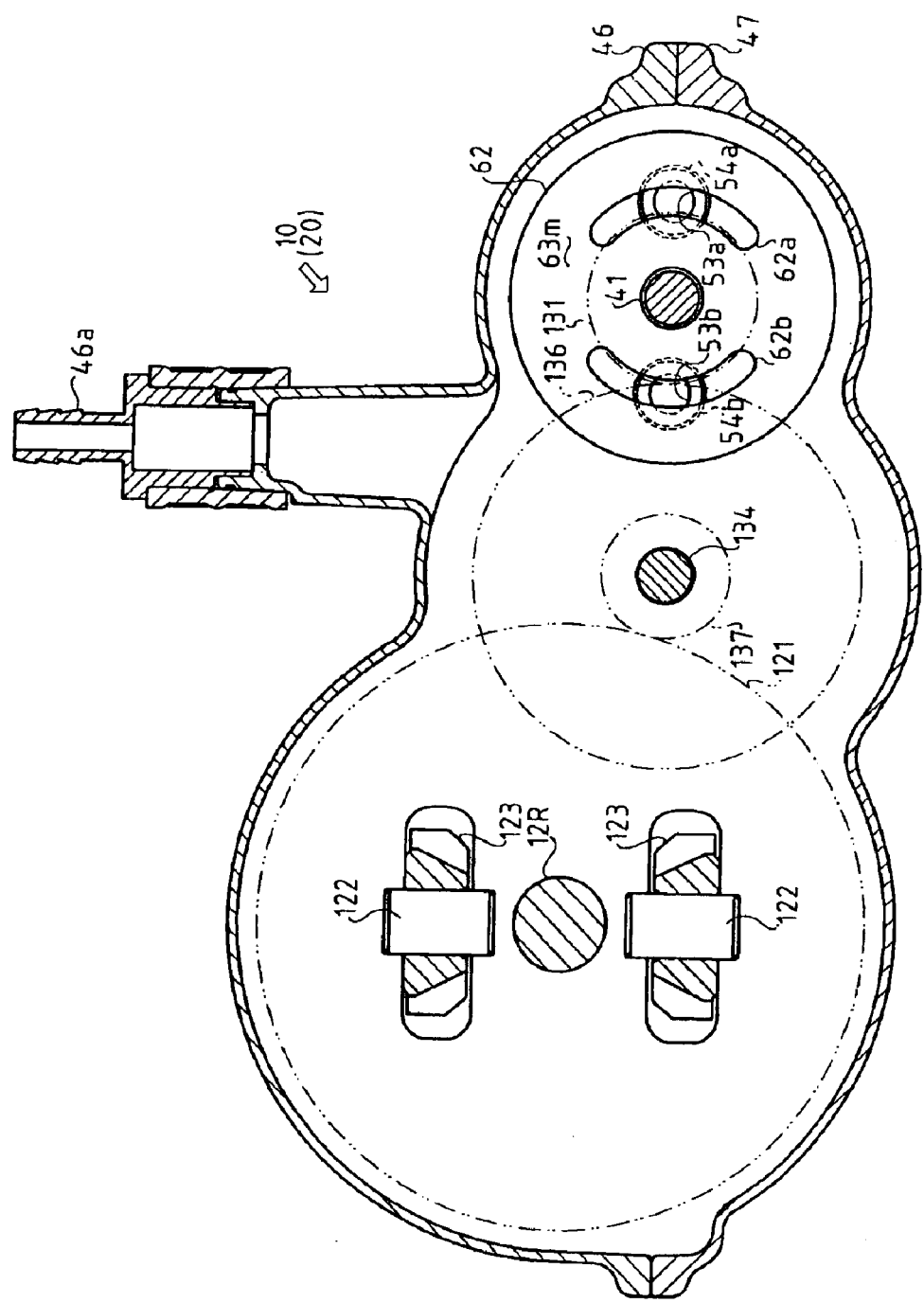
FIG. 8 is a side view partly in section of the axle drive apparatus.

As shown in FIG. 8, the front transaxle apparatus 10 comprises a vertically separable housing formed by joining an upper housing half 46 and a lower housing half 47 through their open surfaces. The housing incorporates a hydraulic motor, etc.

As shown in FIG. 6, an inner space of the housing is divided into first and second chambers 10a and 10b. A differential gearing 120 is disposed in the first chamber 10a, and a hydraulic motor 40 in the second chamber 10b. The driving power of the hydraulic motor 40 is transmitted to the differential gearing 120 through a two-stepped deceleration gear train 135.

Figure 7:
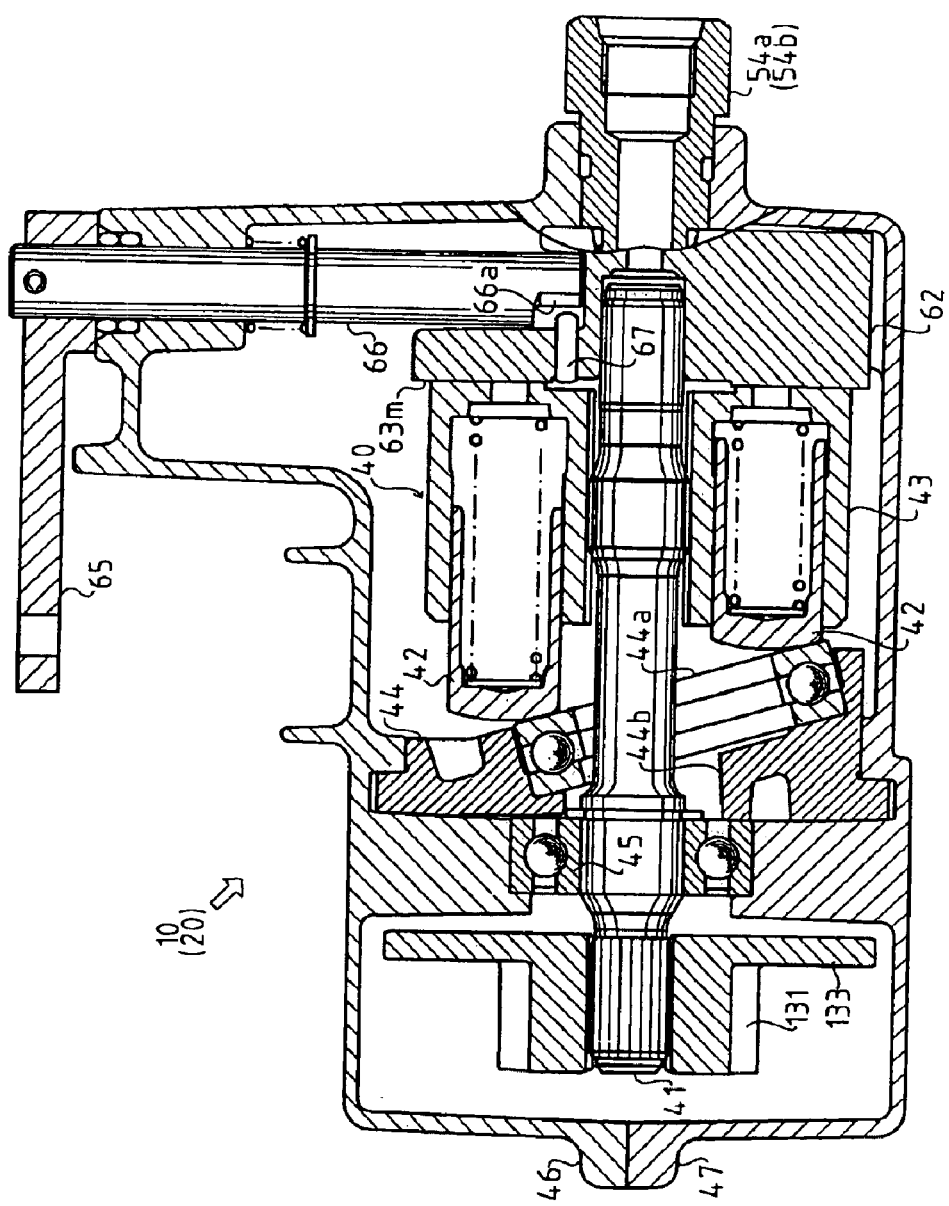
FIG. 7 is a side view partly in section of a hydraulic motor integrally assembled in each of the transaxle apparatuses.

As shown in FIG. 7, in the front transaxle apparatus 10 is integrally assembled the hydraulic motor 40, which comprises a motor center section 62 and a cylinder block 43 slidably rotatably mounted onto a motor mounting surface formed on a vertical portion of the motor center section 62. A plurality of pistons 42 are reciprocally movably fitted into a plurality of cylinder bores in cylinder block 43 through respective biasing springs. Heads of the pistons 42 abut against a thrust bearing 44a of a fixed swash plate 44 which is fixedly sandwiched between upper housing half 46 and lower housing half 47. An opening 44b is provided in the center of the fixed swash plate 44 so as to let the motor shaft 41 perforate therethrough.

In order that the motor shaft 41 may function as an output shaft and be disposed horizontally along the rotary axis of the cylinder block 43, the motor shaft 31 is rotatably supported by a bearing 45 held on the joint surface between the upper and lower housing halves 46 and 47, and is not-relatively rotatably engaged with the cylinder block 43.

Thus, an axial piston type fixed displacement hydraulic motor 40 is constructed in the front transaxle apparatus 10.

Moreover, as shown in FIG. 8, within the motor center section 62 are bored a pair of kidney-ports 62a and 62b from the vertical motor mounting surface 63m, and a pair of horizontal first and second fluid passages 53*a* and 53*b*. The kidney-port 62*a* is connected to the first fluid passage 53*a*, and the kidney-port 62*b* to the second fluid passage 53*b*. As shown in FIG. 6, the first fluid passage 53*a* is connected to a cap 54*a*, and the second fluid passage 53*b* to a cap 54*b*. Hydraulic hoses are connected to the respective caps 54*a* and 54*b* so as to fluidly connect the hydraulic motor 40 to the hydraulic pump 30.

As shown in FIG. 7, a bypass operation lever 65 for opening the first and second fluid passages 53*a* and 53*b* to the fluid sump is disposed above the upper housing half 46. The bypass operation lever 65 is fixed at a basal portion thereof to an upper end of a vertical bypass lever shaft 66 rotatably supported by an upper wall of the upper housing half 46. The lower end of the bypass lever shaft 66 is extended into the motor center section 62 so as to be horizontally slidable against the motor center section 62. A thrust pin 67 is provided and allowed to abut against the rotationally sliding surface of the cylinder block 43. The thrust pin 67 is also allowed to contact at an end surface thereof with a flat surface 66*a* formed by cutting away a bottom side portion of the bypass lever shaft 66.

As shown in FIG. 8, a feeding-and-discharging port 46*a* is formed in an upper portion of the upper housing half 46 so as to let hydraulic fluid flow between the transaxle apparatus and a reservoir tank (FIG. 9), thereby regulating the volume of hydraulic fluid in the transaxle apparatus.

As shown in FIGS. 6 and 7, on an end portion of the motor shaft 41 opposite to the motor center section 62 is spline-fitted a drive output gear 131 so that the drive output gear 131 rotates together with the motor shaft 41. The drive output gear 131 is integrally formed at a side toward the motor center section 62 with a brake rotor 133 whose diameter is larger than that of drive output gear 131. The rotating motor shaft 41 is braked when the brake rotor 133 is pressed between brake pads 134*a* and 134*b* (FIG. 6).

As shown in FIG. 6, a counter shaft 139 is arranged in parallel to the motor shaft 41. A wide small diameter gear 137 is fitted loosely on the counter axis 139, and a large diameter gear 136 is fitted onto a tooted side of the small diameter gear 137, thereby constituting the deceleration gear train 135.

In the deceleration gear train 135, while the large diameter gear 136 engages with the drive output gear 131, the small diameter gear 137 engages with a ring gear 121 of the differential gearing 120 so that driving force of the motor shaft 41 is transmitted to the differential gearing 120 through the deceleration gear train 135.

The differential gearing 120 comprises a ring gear 121 which engages with the small diameter gear 137, pinions 123 rotatably supported by respective pinion shafts 122 which project inward from an inner periphery of the ring gear 121, and side gears 124 fixed onto the respective front wheel axles 12L and 12R and engaging with each of the pinions 123. Thus, the driving force of the motor shaft 41 is transmitted to the front wheel axles [axels] 12L and 12R through the intermediate gearing 135, the ring gear 121, the pinions 123 and the side gears 124. Besides, as shown in later-discussed FIG. 11, the differential gearing 120 may be provided with a differential-lock system so that, even when one of the wheels is bogged in mud etc., the vehicle can escape easily.

The above-mentioned structure of the transaxle apparatus is common to the front and rear transaxle apparatuses 10 and 20, thereby contributing for standardization of component parts so as to reduce costs for manufacture and care.

Description will now be given of the fluid distributor 80. As shown in FIG. 2, the fluid distributor 80 is fluidly connected to the connection port of the center section in housing 70 through hydraulic hoses 81*a* and 81*b*, and also fluidly connected to the center section in the front transaxle apparatus 10 through hydraulic hoses 81*c* and 81*d*, and to the center section in the rear transaxle apparatus 20 through hydraulic hoses 81*e* and 81*f*.

Hydraulic fluid discharged from the hydraulic pump 30 which is drivingly connected with the engine is supplied to the front transaxle apparatus 10 and the rear transaxle apparatus 20 through the fluid distributor 80 so as to rotate the hydraulic motors in both the transaxle apparatuses 10 and 20, thereby driving the front wheel axles 12L and 12R, and the rear wheel axles 22L and 22R, respectively.

Thus, the fluid distributor 80 fluidly connects a hydraulic circuit of the hydraulic pump 30 in the housing 70 to hydraulic circuits of the front transaxle apparatus 10 and the rear transaxle apparatus 20.

Figure 9:
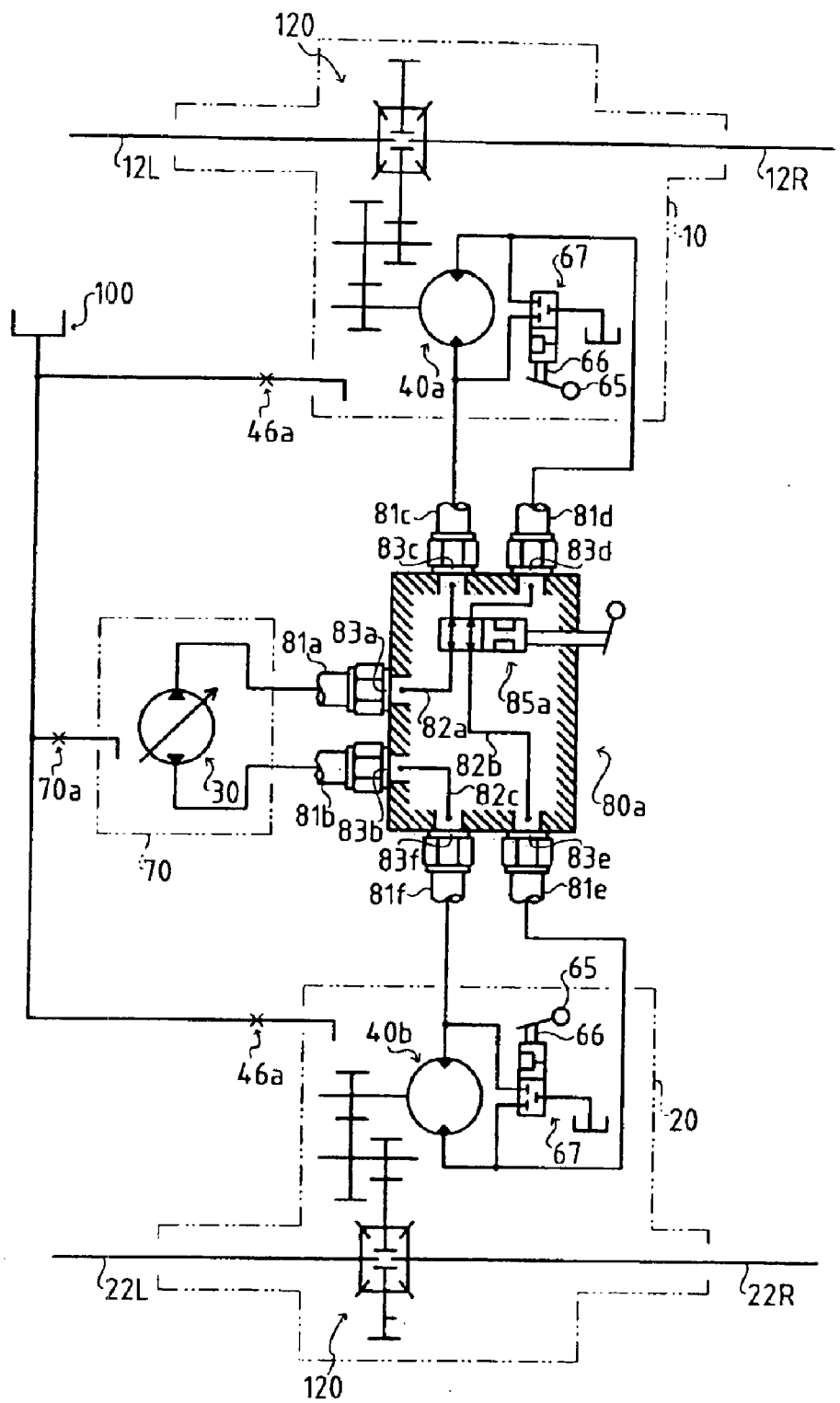
FIG. 9 is a hydraulic circuit diagram including two hydraulic motors connected in series according to an embodiment.
Figure 10:
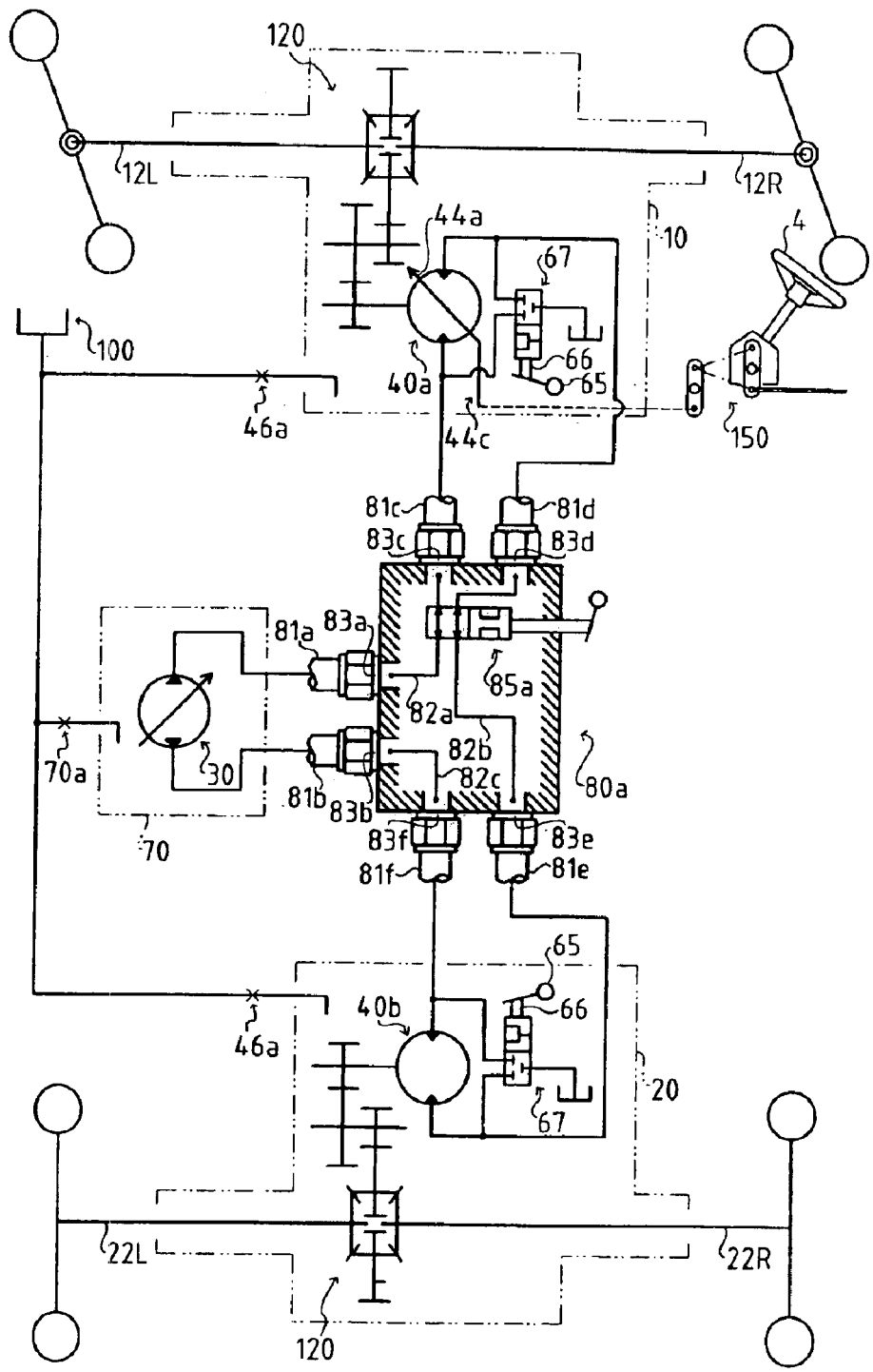
FIG. 10 is a hydraulic circuit diagram including two hydraulic motors connected in series according to another embodiment.
Figure 11:
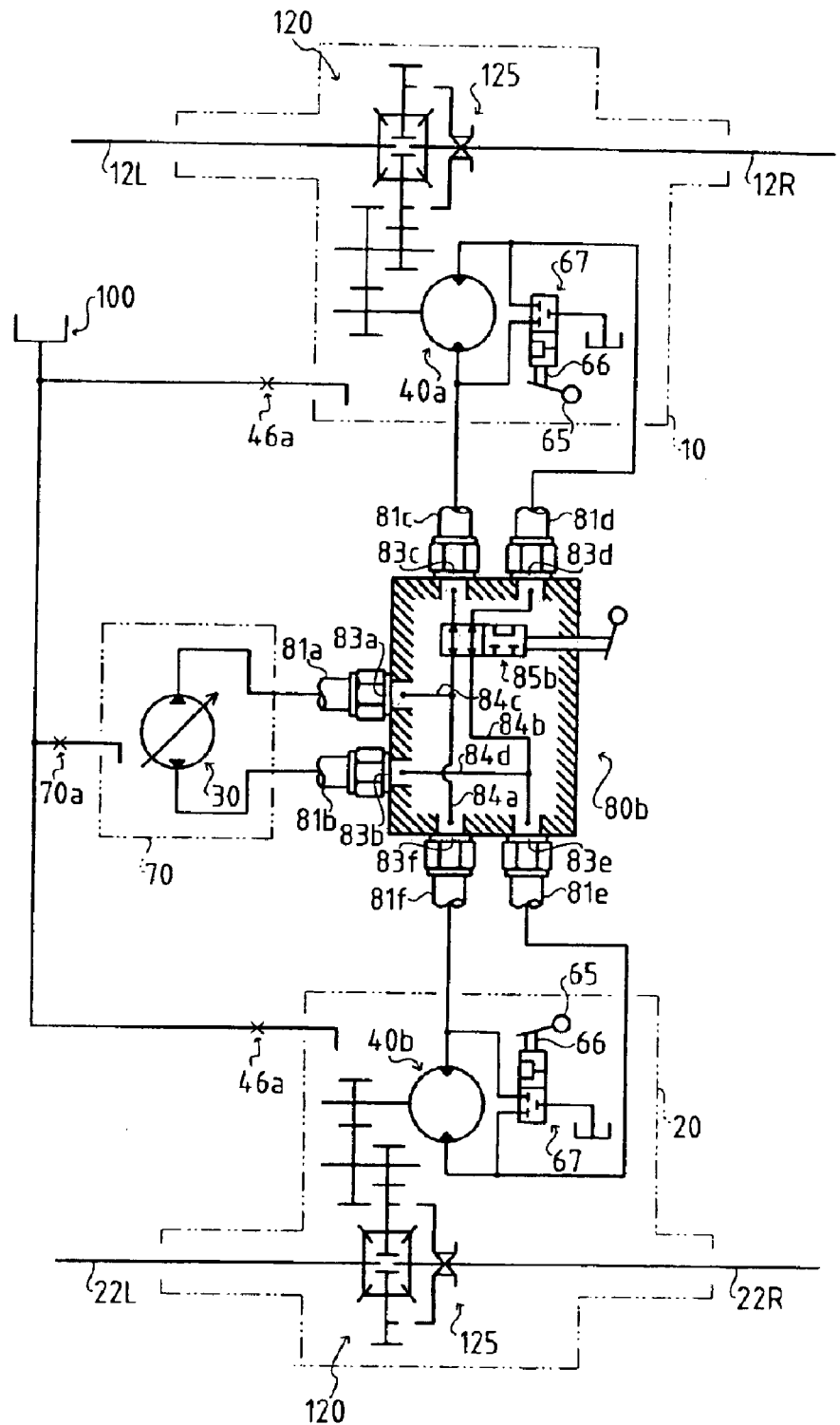
FIG. 11 is a hydraulic circuit diagram including two hydraulic motors connected in parallel.

Two styles as a hydraulic circuit of the fluid distributor 80 are provided for the fluidal connection among the hydraulic motor 30 and the front and rear transaxle apparatuses 10 and 20. One is a fluid distributor 80*a* to connect the hydraulic motor 40*a* in the front transaxle apparatus 10 and a hydraulic motor 40*b* in the rear transaxle apparatus 20 fluidly in series through a control valve 85*a*, as shown in FIGS. 9 and 10. The other is a fluid distributor 80*b* to connect the hydraulic motor 40*a* a hydraulic motor 40*a* in the front transaxle apparatus 10 and a hydraulic motor 40*b* in the rear transaxle apparatus 20 fluidly in parallel through a control valve 85*b*, as shown in FIG. 11.

The fluid distributor 80*a* shown in FIG. 9 fluidly connects both the hydraulic motors 40*a* and 40*b* in series. Especially, the series connection is applicable to an articulate vehicle whose coupling part 50 is arranged at the longitudinally middle position of the vehicle and serves as the center of left and right turning of the vehicle. In short, this circuit is effective to a vehicle which generates no or little (tolerant) rotary speed difference between the front wheels at the time of left or right turning of the vehicle.

As shown in FIG. 9, in the fluid distributor 80 are formed first, second and third fluid passages 82*a*, 82*b* and 82*c*. The first fluid passage 82*a* connects a connection port 83*a* for the hydraulic hose 81*a* and a connection port 83*c* for the hydraulic hose 81*c* through the control valve 85*a*. The second fluid passage 82*b* connects a connection port 83*d* for the hydraulic hose 81*d* and a connection port 83*e* for the hydraulic hose 81*e* through the control valve 85*a*. The third fluid passage 82*c* connects a connection port 83*f* for the hydraulic hose 81*f* and a connection port 83*b* for the hydraulic hose 81*b*.

The control valve 85*a* is a directive control valve having four ports and two positions. At a first position of the control valve 85*a*, the first fluid passage 82*a* and the second fluid passage 82*b* are opened for free passage, respectively. At a second position of the control valve 85*a*, both the first fluid passage 82*a* and the second fluid passage 82*b* are closed, and free fluid passages are formed between the connection ports 83*a* and 83*e*, and between the connection ports 83*c* and 83*d*, respectively.

Due to the above-mentioned construction, when the control valve 85*a* is set at the first position, hydraulic fluid discharged from the hydraulic pump 30 is supplied to the hydraulic motor 40*a* of the front transaxle apparatus 10, for example, through the hydraulic hose 81*a*, the first fluid passage 82*a* and the hydraulic hose 81*b* so as to drive the front wheel axles 12L and 12R. Then, hydraulic fluid is supplied to the hydraulic motor 40b of the rear transaxle apparatus 20 through the hydraulic hose 81d, the second fluid passage 82b and the hydraulic hose 81e so as to drive the rear wheel axles 22L and 22R, and is inhaled into the hydraulic pump 30 through the hydraulic hose 81f, the third fluid passage 82c and the hydraulic hose 81b.

As mentioned above, when the control valve 85a is set at the first position, the vehicle drives four wheels, in which the front transaxle apparatus 10 drives the front wheel axles 12L and 12R, and the rear transaxle apparatus 20 the rear wheel axles 22L and 22R, thereby being excellent in traveling on a bad ground or ascent.

Especially, the four-wheel drive vehicle employing the fluid circuit with the series connection, is excellent in escaping performance at the time of a wheel being bogged in mud. For example, when a front wheel is stuck in mud, hydraulic fluid discharged from the hydraulic pump 30 flows to the hydraulic motor 40a of the front transaxle apparatus 10 so as to idle the unloaded front wheels, and then flows to the hydraulic motor 40b of the rear transaxle apparatus 20 so as to rotate the loaded rear wheels, too, whereby the vehicle can escape from mud smoothly with driving the rear wheels surely.

On the other hand, when the control valve 85a is set at the second position, hydraulic fluid is not supplied to the hydraulic motor 40a of the front transaxle apparatus 10, that is, hydraulic fluid is supplied only to the hydraulic-motor 40b of the rear transaxle apparatus 20 so as to rotate only the rear wheel axles 22L and 22R, so that the vehicle drives only the rear wheels, thereby being excellent in steering performance.

Alternatively, although not shown, in the control valve 85a may be changed the connection form among the hydraulic hoses 81c, 81d, 81e and 81f. That is, the connection ports 83c and 83d may be connected to the hydraulic motor 40b on the rear frame 21, and the connection ports 83e and 83f to the hydraulic motor 40a on the front frame 11, thereby establishing the vehicle into a front-wheel drive mode, where the vehicle drives only the front wheel axles 12L and 12R and is excellent in steering performance.

Further alternatively, the connection ports 83c and 83d may be connected to each other through a hydraulic hose so as to bypass the hydraulic motor 40a, or the connection ports 83e and 83f may be connected to each other through a hydraulic hose so as to bypass the hydraulic motor 40b, so that the control valve 85a is fixed to the first position without being switched to the second position, thereby making either a front-wheel drive vehicle or a rear-wheel drive vehicle.

Furthermore, as shown in FIG. 10, in the front transaxle apparatus 10 which drives the front wheels, it is applicable that a swash plate 44a of the hydraulic motor 40a is movable and a control arm 44b for adjusting the tilt angle of the swash plate 44a is interlockingly connected to the steering wheel 4 through a wire, a link or so on, thereby changing the swash plate angle according to the angle of the steering wheel 4 so as to increase the rotary speed of the front wheel axles.

This composition is especially effective to improve steering performance of a vehicle whose body is arranged so as not to generate a rotary speed difference between the front wheels and the rear wheels when the vehicle turns, i.e., a vehicle whose coupling part 50 is not disposed at the longitudinally middle position of the vehicle, or a four-wheel drive riding lawn mower in which the front wheels are steered by an Ackerman steering system as shown in FIG. 10.

Namely, by making the hydraulic motor for driving steerable (front) wheels into a variable displacement type and increasing the rotary speed of the hydraulic motor in correspondence to the angle of the steering wheel, improved steering performance can be provided for a vehicle such as the riding lawn mower, which has such a body arrangement as to generate a rotary speed difference between the front wheels and the rear wheels at the time of turning of the vehicle, and in which both the hydraulic motors in front and rear transaxle apparatuses are fluidly connected in series.

Next, the fluid distributor 80b shown in FIG. 11 fluidly connects both the hydraulic motors 40a in parallel. This parallel connection style is especially applicable to a vehicle which turns with a rotary speed difference between front wheels and rear wheels.

As shown in FIG. 11, in the fluid distributor 80 are formed first, second, third and fourth fluid passages 84a, 84b, 84c and 84d. The first fluid passage 84a connects a connection port 83c for the hydraulic hose 81c and a connection port 83f for the hydraulic hose 81f through a control valve 85b. The second fluid passage 84b connects a connection port 83d for the hydraulic hose 81d and a connection port 83e for the hydraulic hose 81e through the control valve 85b. The third fluid passage 84c connects the first fluid passage 84a to a connection port 83a for the hydraulic hose 81a. The fourth fluid passage 84d connects the second fluid passage 84b to a connection port 83b for the hydraulic hose 81b.

The control valve 85b is a directive control valve having four ports and two positions. At the first position of the control valve 85b, the first fluid passage 84a and the second fluid passage 84b are opened for free passage respectively. At the second position of the control valve 84b, the first fluid passage 84a and the second fluid passage 84b are closed, and a free fluid passage is formed between the connection port 83c and the connection port 83d.

Due to the above composition, when the control valve 85b is set at the first position, hydraulic fluid discharged from the hydraulic pump 30 is supplied to the hydraulic motors 40a and 40b of the front and rear transaxle apparatuses 10 and 20, for example, through the hydraulic hose 81a, the third fluid passage 84c, the first fluid passage 82a, and the hydraulic hoses 81c and 81f, respectively, so as to drive the front and rear wheel axles 12L, 12R, 22L and 22R. Then, hydraulic fluid discharged from the hydraulic motors 40a and 40b is inhaled into the hydraulic pump 30 through the respective hydraulic hoses 81d and 81e, the second fluid passage 84b, the fourth fluid passage 84b, and the hydraulic hose 81b.

In this way, when the control valve 85b is set at the first position, both the front transaxle apparatus 10 and the rear transaxle apparatus 20 drive the front wheel axles 12L and 12R, and the rear wheels axle 22L and 22R, respectively, so that the vehicle drives four wheels and is excellent in steering performance and traveling performance on a bad ground or ascent.

On the other hand, when the control valve 85b is set at the second position, hydraulic fluid is not supplied to the hydraulic motor 40a of the front transaxle apparatus 10, that is, hydraulic fluid is supplied only to the hydraulic motor 40b of the rear transaxle apparatus 20 so as to drive only the rear wheel axles 22L and 22R, whereby the vehicle drives only the rear wheels and is excellent in steering performance.

Alternatively, although not shown, in the control valve 85b may be changed the connection form among the hydraulic hoses 81c, 81d, 81e and 81f. That is, the connection ports 83c and 83d may be connected to the hydraulic motor 40b on the rear frame 21, and the connection ports 83e and 83f to the hydraulic motor 40a on the front frame 11, thereby establishing the vehicle into a front-wheel drive mode, where the vehicle drives only the front wheel axles 12L and 12R and is excellent in steering performance.

Further alternatively, a rear-wheel drive vehicle may be made by plugging the connection ports 83c and 83d and holding the control valve 85a at the first position without shifting it to the second position.

Moreover, when employing the parallel connection form as shown in FIG. 11, preferably, the differential gearings 120 of the front and rear transaxle apparatuses 10 and 20 are provided with respective differential-lock systems 125 for restricting the differential rotation of the respective left and right axles, and the vehicle is provided with a control lever for controlling the differential-lock systems 125. Thus, the vehicle is so designed that the differential rotation of the axles is restrained when a wheel is stuck.

According to the parallel connection, hydraulic fluid is divided between the two hydraulic motors 40a and 40b, thereby causing such a problem that a larger amount of hydraulic fluid slows into a lighter-loaded hydraulic motor of the two. If a right front wheel driven by the front hydraulic motor 40b is stuck, for example, the rear hydraulic motor 40b is not supplied with hydraulic fluid and the rear wheels do not drive, whereby the vehicle cannot escape from being bogged.

However, in this case, by operating the differential-lock system 125, load which makes the left front wheel drive is given to the hydraulic-motor 40a, a proper quantity of hydraulic fluid is supplied to the rear hydraulic motor 40b so as to rotate the rear wheels, thereby enabling the vehicle to escape.

Whether the series connection form or the parallel connection form may be applied to the hydraulic circuit of the vehicle, the position of the control valve 85a or 85b may be decided so as to select the driving style of the vehicle between the four-wheel drive and the rear-wheel drive. Thus, vehicles having the same structure in different driving styles can be provided to a market, so that standardization of manufactured parts is realized for reduction of costs.

In this way, the driving style of the vehicle may be selected before shipment from a factory. Alternatively, the vehicle may be provided with an operation lever for switching the position of the control valve 85a or 85b so that a driver can optionally operate the lever so as to select the driving mode of the vehicle between the four-wheel drive mode and the two-wheel drive mode (rear-wheel drive mode or front-wheel drive mode) even when the vehicle travels.

The present invention constructed as described above has the following effects.

A articulate vehicle can drive four wheels so as to improve its steering performance and traveling performance against a bad ground or ascent.

According to such arrangement of the hydraulic motors as to be incorporated in the respective front and rear transaxle apparatuses, a drive train comprising each transaxle apparatus and its corresponding hydraulic motor can be compact.

Since both the front and rear transaxle apparatuses share the same construction, manufactured parts are standardized so as to save costs.

Of both the transaxle apparatuses, one has a distal side with respect to the vehicle, to which a working device is attached, and supports a pair of axles having different lengths. A transmission element for drivingly connecting the engine to the working device crosses a longer axle of the pair of axles. Due to this structure, the transmission element for the working device does not reduce the road clearance of the vehicle.

Since the heavy front and rear transaxle apparatuses are identical with each other in shape and distributed into one side and the other in a lateral direction of the vehicle, the weights of the transaxle apparatuses are distributed left and right so as to balance the vehicle excellently.

Figure 12:
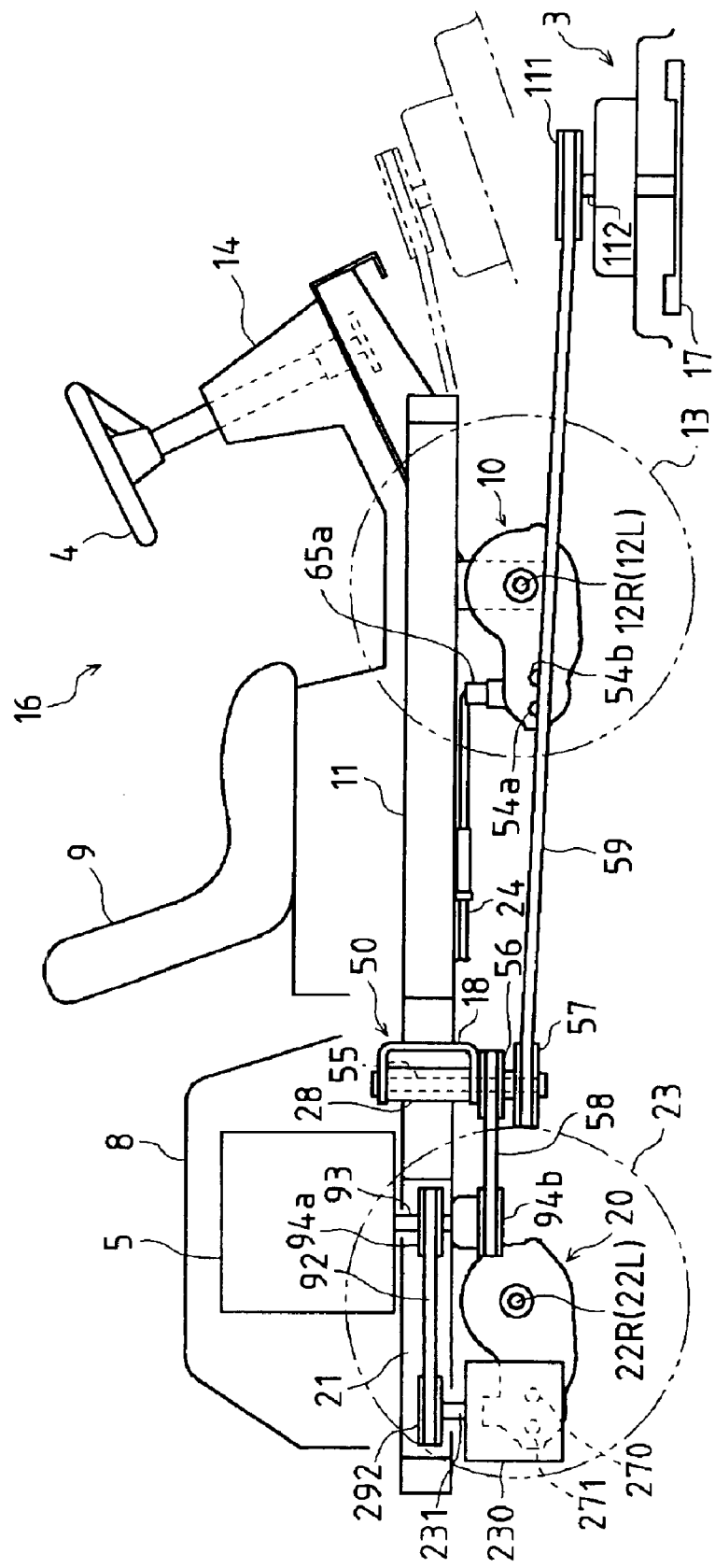
FIG. 12 is a side view of riding lawn mower as a second embodiment of a four-wheel-drive articulate working vehicle according to the present invention, wherein front and rear axles are unequally distant from a pivot connecting front and rear frames, and a hydraulic motor in a front transaxle apparatus is variable in displacement.
Figure 13:
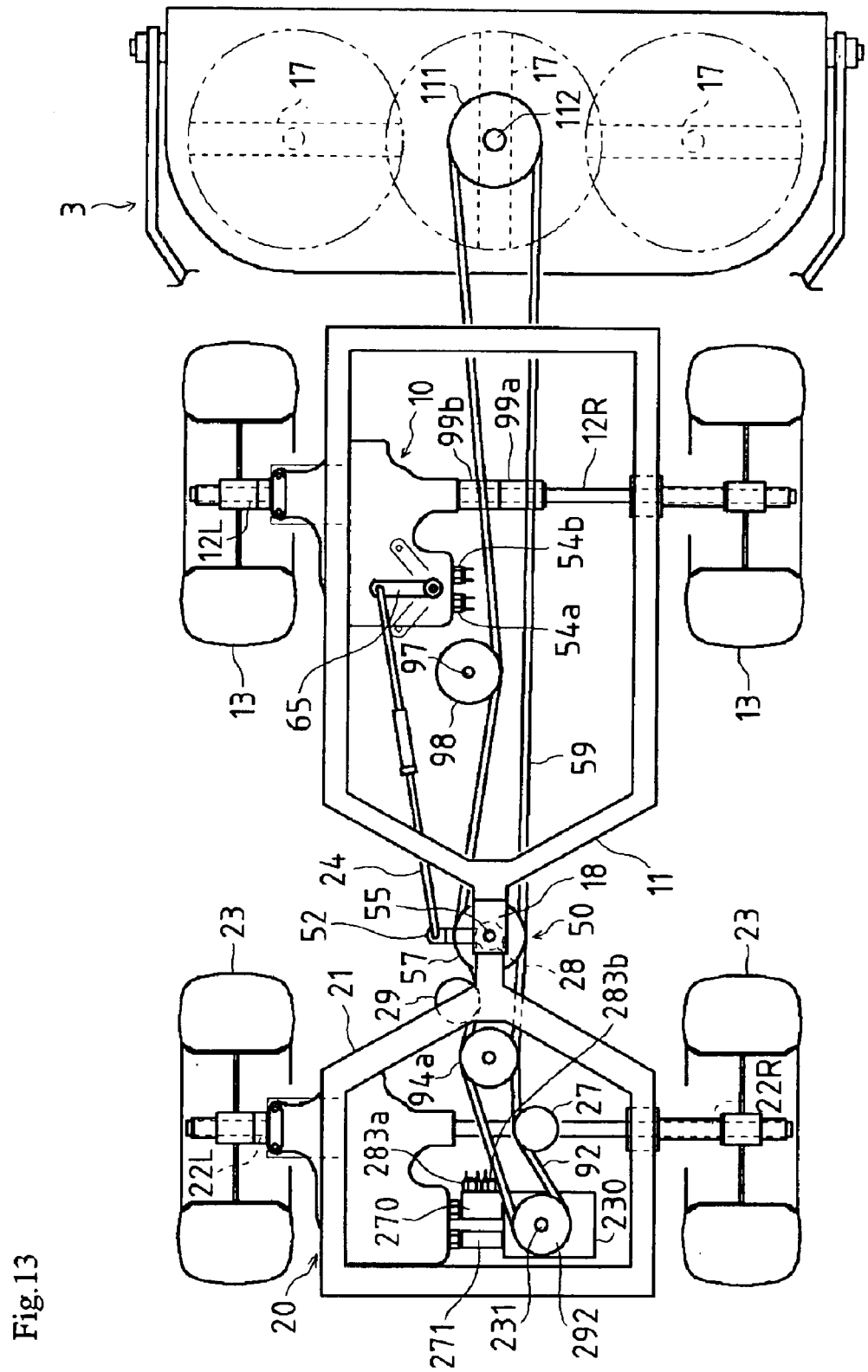
FIG. 13 is a plan view partly in section of the vehicle of FIG. 12.

Next, description will be given of a four-wheel-drive articulate working vehicle according to a second embodiment of the present invention shown in FIGS. 12 to 22. FIGS. 12 and 13 show a working vehicle equipped at a front portion thereof with a mower device 3 serving as a working device. This vehicle has a front frame 11, which is longer than a rear frame 21 pivotally connected to the front frame 11. The front frame 11 is provided with a front transaxle apparatus 10 from which front wheel axles 12L and 12R (hereinafter, "a front wheel axle 12" is used as a generic name of the front wheel axles 12L and 12R) are extended in a transverse direction and fixed to respective front wheels 13. The rear frame 21 is provided with a rear transaxle apparatus 20 from which rear wheel axles 22L and 22R (hereinafter, "a rear wheel axle 22" is used as a generic name of the rear wheel axles 22L and 22R) are extended in a transverse direction and fixed to respected rear wheels 23.

A rear end portion of the front frame 11 is horizontally rotatably coupled to a front end portion of the rear frame 21 through a coupling part 50. The coupling part 50 constitutes a pivot for rotation of the frames 11 and 21. Thus, the working vehicle including the horizontally turnable front and rear frames 11 and 21 is bendable at the intermediate portion thereof, thereby being a so-called articulate vehicle. When the vehicle is not bent, the coupling part 50 is disposed at the lateral middle position of the vehicle behind the longitudinal middle position of the vehicle from which the front wheel axle 12 and the rear wheel axle 22 are equally distant. Therefore, the vehicle body is bendable at a rather rearward position than the longitudinal middle position.

A steering column 14, a steering wheel 4, and a foot pedal are arranged in a front portion of the front frame 11, and a seat 9 is disposed behind the steering column 14, thereby constituting a driver's unit 16 on the front frame 11. The mower device 3 is vertically movably provided in front of the front frame 11, that is, at a downwardly forward position from the driver's unit 16. The mower device 3 is driven by an engine 5.

The engine 5 covered with a bonnet 8 is disposed on the rear frame 21. The rear transaxle apparatus 20 is arranged under the engine 5. A hydraulic pump 230 is connected to a lateral inward side of the rear transaxle apparatus 20. A pump input pulley 292 is fixed onto a vertical pump shaft 231 projecting upward from the hydraulic pump 230. A hydraulic motor 240 disposed in the rear transaxle apparatus 20 and a hydraulic motor 40 in the front transaxle apparatus 10 are fluidly connected in series to the hydraulic pump 230 through a closed fluid circuit. These parts compose a hydrostatic transmission (HST).

In front of the pump shaft 231, the engine 5 has a downwardly vertical output shaft 93 fixedly provided thereon with a first engine output pulley 94a and a second engine output pulley 94b under the first engine output pulley 94a.

In front of the front frame 11, the mower device 3 serving as a working device is provided therein with mowing blades 17 and a substantially vertical drive shaft 112 for driving the mowing blades 17. The drive shaft 112 projects upward and is fixedly provided thereon with a mower input pulley 111.

Regarding the coupling part 50, a vertically cylindrical pivotal connector 28 is fixed on the laterally middle front end of the rear frame 21 and not-relatively rotatably supports a vertical pivot shaft 55 therethrough. A pivotal connecter 18 made of a U-shaped plate is fixed on the laterally middle rear end of the front frame 11 and rotatably connected to upper and lower portions of the pivot shaft 55 projecting from the pivotal connector 28. In this way, the pivotal connectors 18 and 28 and the pivot shaft 55 constitute the coupling part 50 pivotally connecting the front frame 11 to the rear frame 21 so that the front and rear frames 11 and 21 are horizontally rotatable relative to each other around the pivot shaft 55.

A lower end of the pivot shaft 55 is extended downward from the pivotal connector 18 so as to rotatably support a deceleration pulley set consisting of a first intermediate pulley 56 and a second intermediate pulley 57, which are integrally rotatable on the pivot shaft 55 through a bearing (not shown).

On the rear frame 21 side, a rear drive transmission belt 92 is interposed between the first engine output pulley 94a and the pump input pulley 292 behind the pulley 94a, and tensed by a first rear idle pulley 27, and a first working-device drive transmission belt 58 is interposed between the second engine output pulley 94b and the first intermediate pulley 56, and tensed by a second rear idle pulley 29.

On the front frame 11 side, a second working-device drive transmission belt 59 is interposed between the second intermediate pulley 57 and the mower input pulley 111, and tensed by an idle pulley 98 rotatably provided on a vertical shaft 97 suspended from the front frame 11.

Due to this construction, engine output is transmitted to the pump input pulley 292 through the rear drive transmission belt 92 from the first engine output pulley 94a so as to rotate the pump shaft 231, thereby driving the front and rear wheels 13 and 23. The engine output is also transmitted from the second engine output pulley 94b to the mower input pulley 111 through the first belt 58, the first and second intermediate pulleys 56 and 57 and the second belt 59, thereby rotating the mowing blades 17 in the mower device 3.

The front transaxle apparatus 10 supporting the left and right front wheel axles 12R and 12L is disposed rather leftward than the lateral middle in the front frame 11 so that the right front wheel axle 12R is longer than the left front wheel axle 12L.

As shown in FIG. 13, a pair of left and right collars 99a and 99b are freely rotatably provided on the right front wheel axle 12R at a substantially laterally middle position of the front frame 11. The second working-device drive transmission belt 59 crosses the longer right front wheel axle 12R in contact with tops of the collars 99a and 99b. In this state, the collars 99a and 99b freely rotate, following the driving belt 59, in opposite directions on the axle 12R, thereby preventing the belt 59 from being frictionally damaged.

As shown in FIG. 13, while a horizontal stay 52 fixedly projects outward from an outer periphery of the pivotal connector 28 fixed to the rear frame 21, a motor control lever 65 is horizontally rotatably disposed above the front transaxle apparatus 10 fixed to the front frame 11. A rod 24 is pivotally interposed between the stay 52 and the motor control lever 65. Therefore, if the vehicle turns so as to change the angle between the front and rear frames 11 and 21, the rod 24 pivotally connected to the stay 52 pushes or pulls the motor control lever 65 so as to rotate the lever 65 in the longitudinal direction of the front frame 11. The motor control lever 65 is interlockingly connected to a movable swash plate 44 of the variable displacement hydraulic motor 40 disposed in the front transaxle apparatus 10.

In this way, the stay 52 fixed to the pivotal connector 28 in the coupling part 50, the rod 24 pivotally supported by the stay 52, and the motor control lever 65 compose a linkage for varying a relative velocity between the front wheel axle 12 and the rear wheel axle 22.

Figure 14:
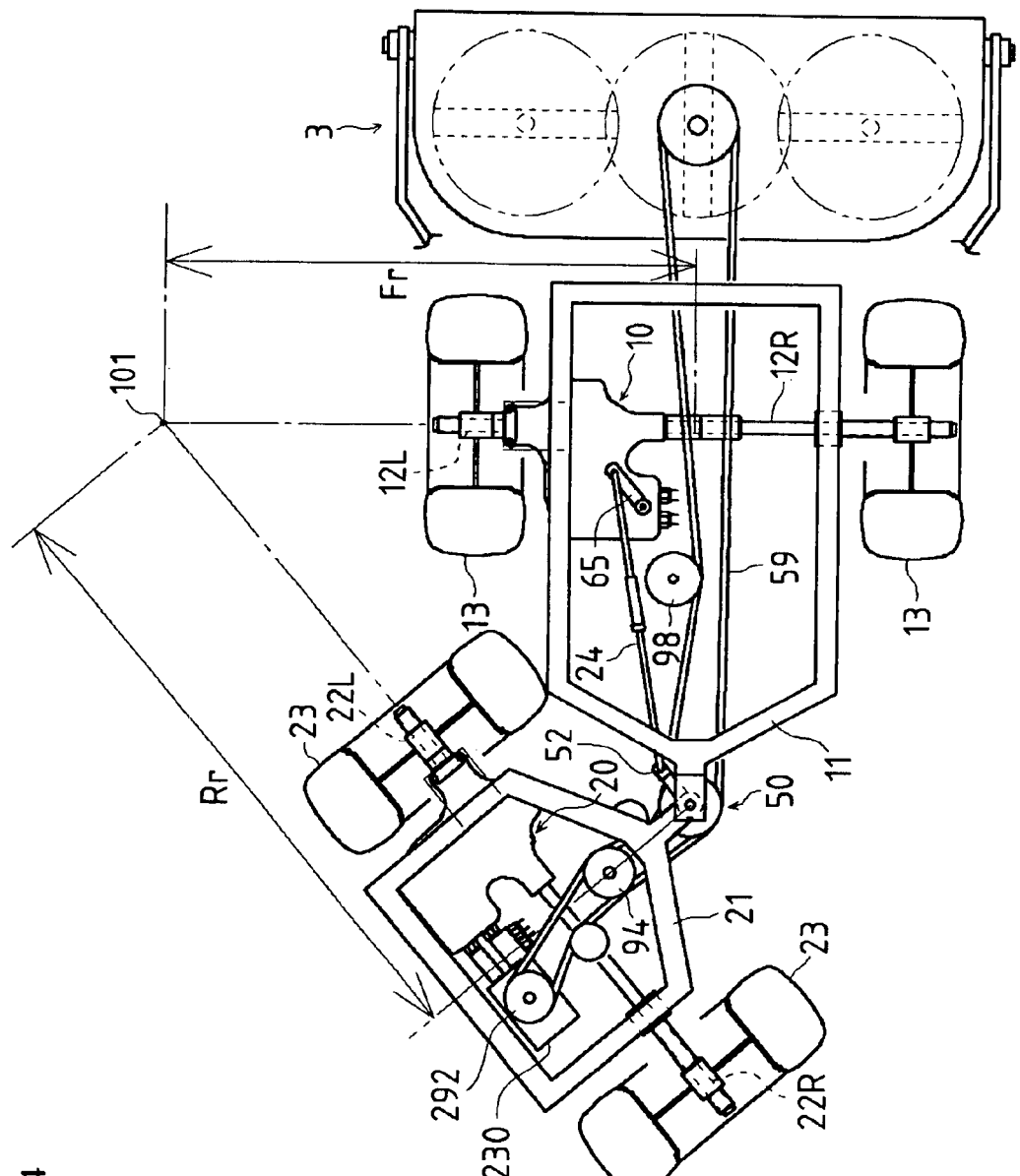
FIG. 14 is a plan view partly in section of the vehicle when turning.

Description will now be given of means for turning of the four-wheel-drive articulate working vehicle according to the second embodiment. The vehicle is provided with an actuator (not shown) such as a hydraulic cylinder for turning the vehicle. The actuator bends the vehicle body with respect to the coupling part 50 as shown in FIG. 14, i.e., horizontally relatively rotates the front frame 11 and the rear frame 21 around the vertical axis (the pivot shaft 55) of the coupling part 50, thereby turning the vehicle. Thus, neither the direction of the front wheel axle 12 relative to the front frame 11 nor the direction of the rear wheel axle 22 relative to the rear frame 21 is changed while the vehicle is turning.

The above-mentioned linkage is moved according to this bending motion of the vehicle body (variation of the angle between the front frame 11 and the rear frame 21) for turning of the vehicle, thereby steplessly changing the relative velocity between the front wheel axle 12 and the rear wheel axle 22.

As shown in FIG. 14, a turning circle center 101 of the vehicle is an intersection point where an extended axial line of the front wheel axle 12 intersects an extended axial line of the rear wheel axle 22. Since a ratio between a distance Fr from the turning circle center 101 to a middle point of front wheel axle 12 and a distance Rr from the turning circle center 101 to a middle point of rear wheel axle 22 varies according to variation of the turning angle of the vehicle, a relative velocity between the front wheel axle 12 and the rear wheel axle 22 needs to vary steplessly so as to realize smooth turning of the vehicle without dragging any of the wheels 13 and 23.

In this embodiment, the distance from the coupling part 50 (pivot shaft 55) to the front wheel axle 12 is longer than the distance from the coupling part 50 (pivot shaft 55) to the rear wheel axle 22, so that the distance Fr is always shorter than the distance Rr.

The more sharply the vehicle turns (the larger the bending angle of the vehicle body becomes), the larger a ratio of the distance Rr to the distance Fr becomes. Therefore, the relative velocity between the front wheel axle 12 and the rear wheel axle 22 is set to vary according to variation of the ratio of distance Fr to Rr. The linkage including the rod 24 moves to change the motor control lever 65 angle according to variation of the bending angle of the vehicle, whereby a tilt angle of the movable swash plate 44 varies so as to change the relative velocity between the front wheel axle 12 and the rear wheel axle 22.

Due to the above structure, for example, the more sharply the vehicle turns, the more slowly the front wheel axle 12 rotates so that the front wheel axle 12 becomes slower than the rear wheel axle 22 so as to compensate for increase of the ratio of distance Rr to Fr, whereby the vehicle turns smoothly without drag of the wheels 13 or 23. Accordingly, the vehicle, when it is used as a riding lawn mower, prevents a lawn from being damaged by a dragged wheel. A concrete structure for turning of the vehicle will be discussed in later description of the front transaxle apparatus 10.

Figure 16:
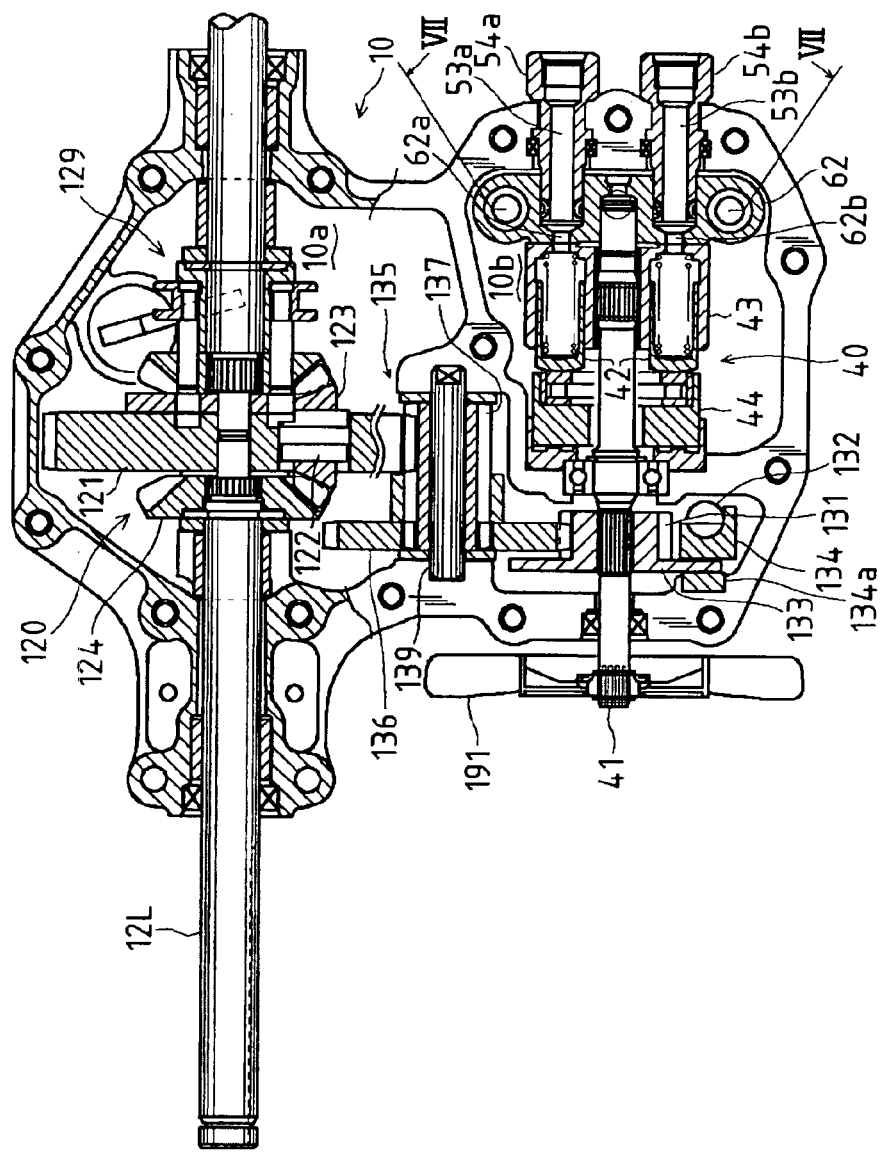
FIG. 16 is a plan view of a front transaxle apparatus of the vehicle from which an upper housing half is removed.
Figure 17:
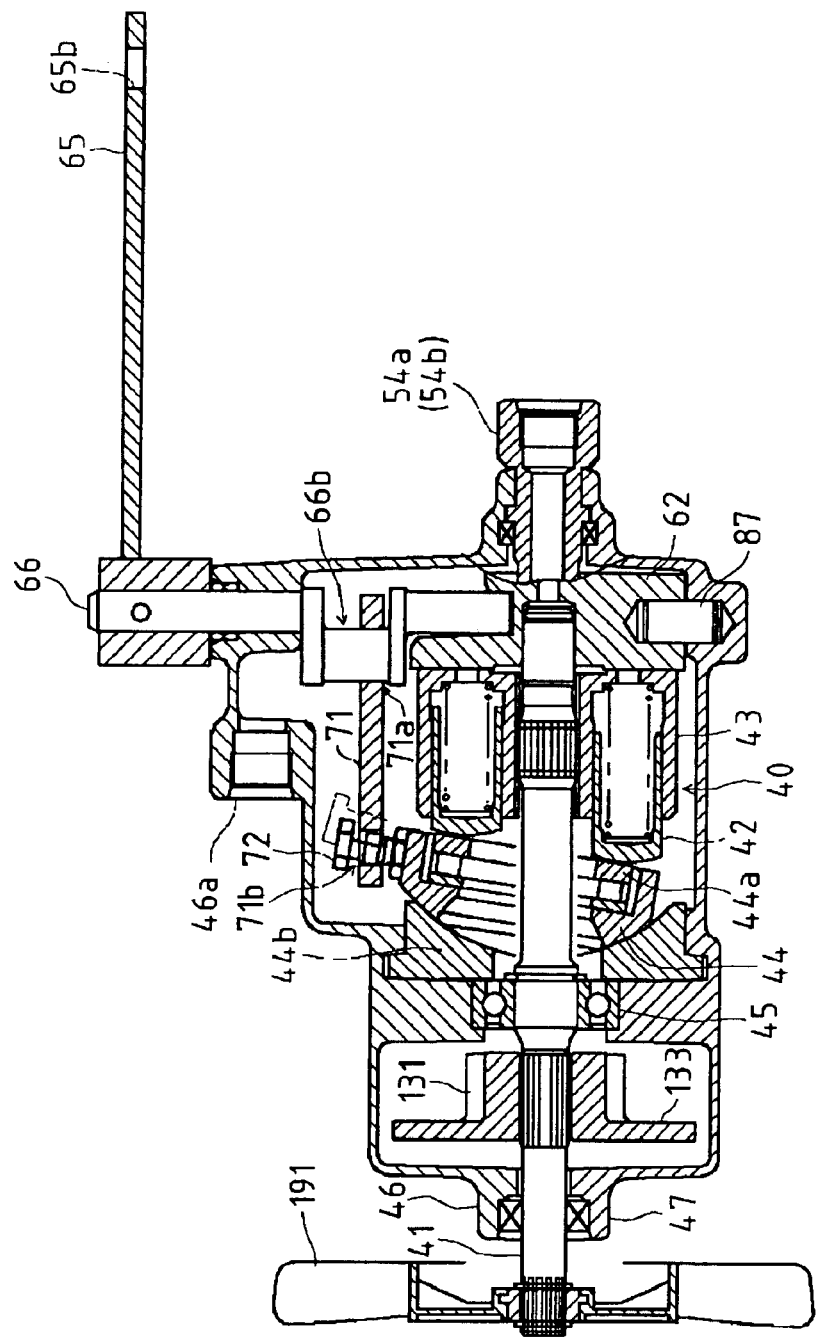
FIG. 17 is a rear view partly in section of the front transaxle apparatus.
Figure 18:
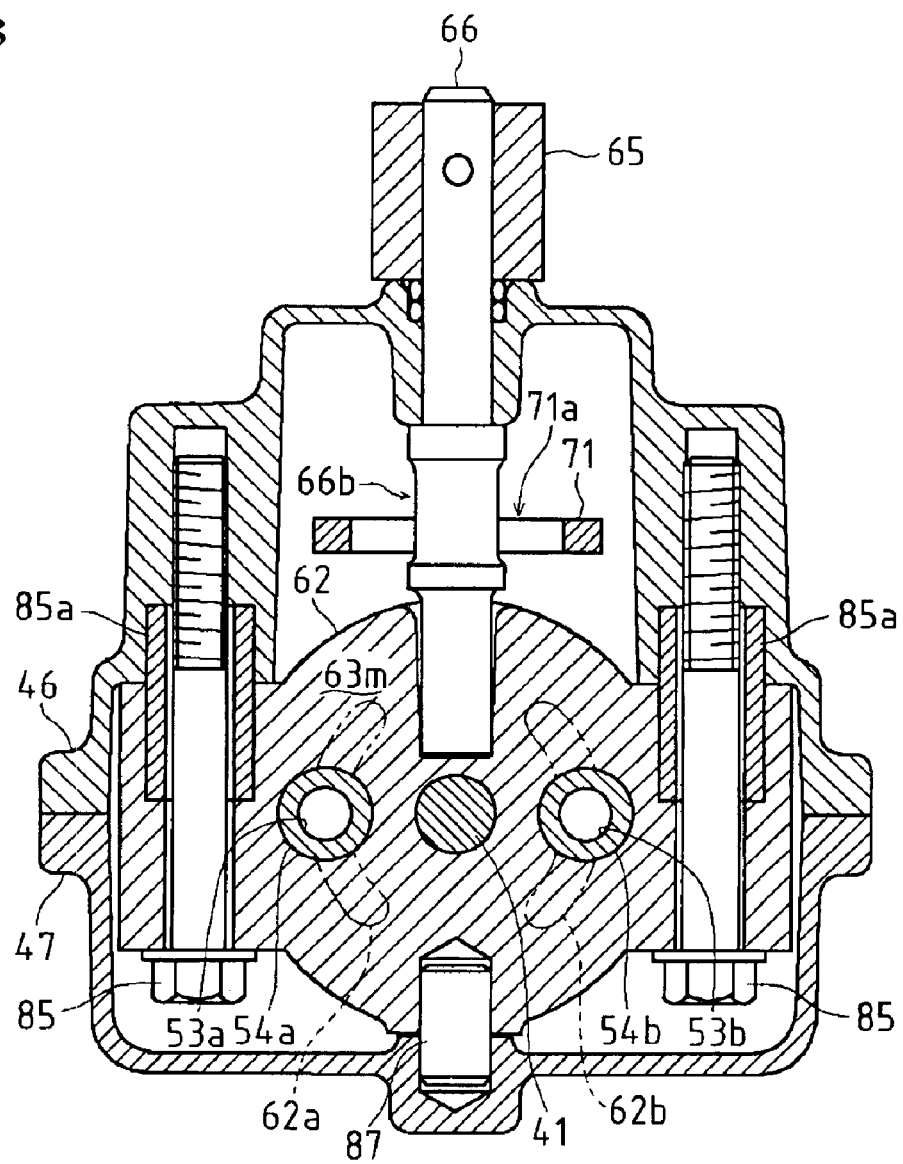
FIG. 18 is a sectional view in the direction of the arrows VII—VII of FIG. 16.

Next, description will be given of the front transaxle apparatus 10 and the rear transaxle apparatus 20. As shown in FIGS. 16, 17, and 18, an upper housing half 46 and a lower housing half 47 are vertically joined to each other so as to form one housing, which provides the external appearance of the front transaxle apparatus 10 and incorporates a fluid sump, the hydraulic motor 40 and others.

As shown in FIG. 16, the hollow interior of the housing is divided into a first chamber 10a for incorporating a counter shaft 139 with a reduction-gear train 135 thereon, a differential gear unit 120 and the front wheel axles 12L and 12R and a second chamber 10b for incorporating the hydraulic motor 40. Driving force of hydraulic motor 40 is transmitted to the differential gear unit 120 through the reduction-gear train 135.

As shown in FIG. 18, for arranging the hydraulic motor 40 in the second chamber 10b, a platy center section 62 is fixed along an inside surface of the housing. To be concrete, a pair of vertical hollow dowel pins 85a are fitted into opposite end portions of the center section 62 so as to temporarily engage the center section 62 with side walls of the upper housing half 46, and then, vertical bolts 85 pierce the center section 62 and the respective dowel pins 85a and are screwed into the side walls of the upper housing half 46, thereby tightly fixing the center section 62 to the upper housing half 46. At this time, a vertical motor mounting surface 63m formed on the center section 62 comes to coincide at the center point thereof with the joint surface between upper and lower housing halves 46 and 47. Further, a pin 87 is planted into a bottom portion of the center section 62 along the middle line of the center section 62 between the fitting bolts 85. When the lower housing half 47 is joined with the upper housing half 46, the pin 87 projecting from the bottom of the center section 62 comes to fit into the bottom of lower housing half 47. Therefore, even when the center section 62 receives counter hydraulic pressure from the hydraulic motor 40, the center section 62 is not tilted or brought down, thereby minimizing oil leak from the center section 62. Therefore, a designed volumetric efficiency of the hydraulic motor 40 or the HST is maintained.

The hydraulic motor 40 is integrally disposed within the front transaxle apparatus 10. On a vertical portion of the center section 62 is formed the vertical motor mounting surface 63m on which a cylinder block 43 is rotatably and slidably fitted. A plurality of pistons 42 are reciprocally movably fitted through respective biasing springs into a plurality of cylinder bores in the cylinder block 43. A thrust bearing 44a of a movable swash plate 44 abuts against heads of the pistons 42. A retainer 44b is fixedly sandwiched between the upper and lower housing halves 46 and 47 so as to slidably fit the movable swash plate 44. The movable swash plate 44 together with the thrust bearing 44a and the retainer 44b are penetrated by a hole through which a motor shaft 41 is allowed to pass freely.

The motor shaft 41 has a horizontal axis located on the joint surface between the upper and lower housing halves 46 and 47. The motor shaft 41 axially passes through the cylinder block 43 and is not-relatively rotatably fitted with the cylinder block 43. The motor shaft 41 is rotatably fitted at one end thereof into center section 62. The motor shaft 41 is extended from the cylinder block 62 at the other end thereof through a sealed bearing 45 sandwiched between the housing halves 46 and 47 so as to serve as an output shaft of the hydraulic motor 40 for outputting rotary force to the differential gear unit 120.

In this way, the axial piston type variable displacement hydraulic motor 40 is constructed in the front transaxle apparatus 10.

Figure 19:
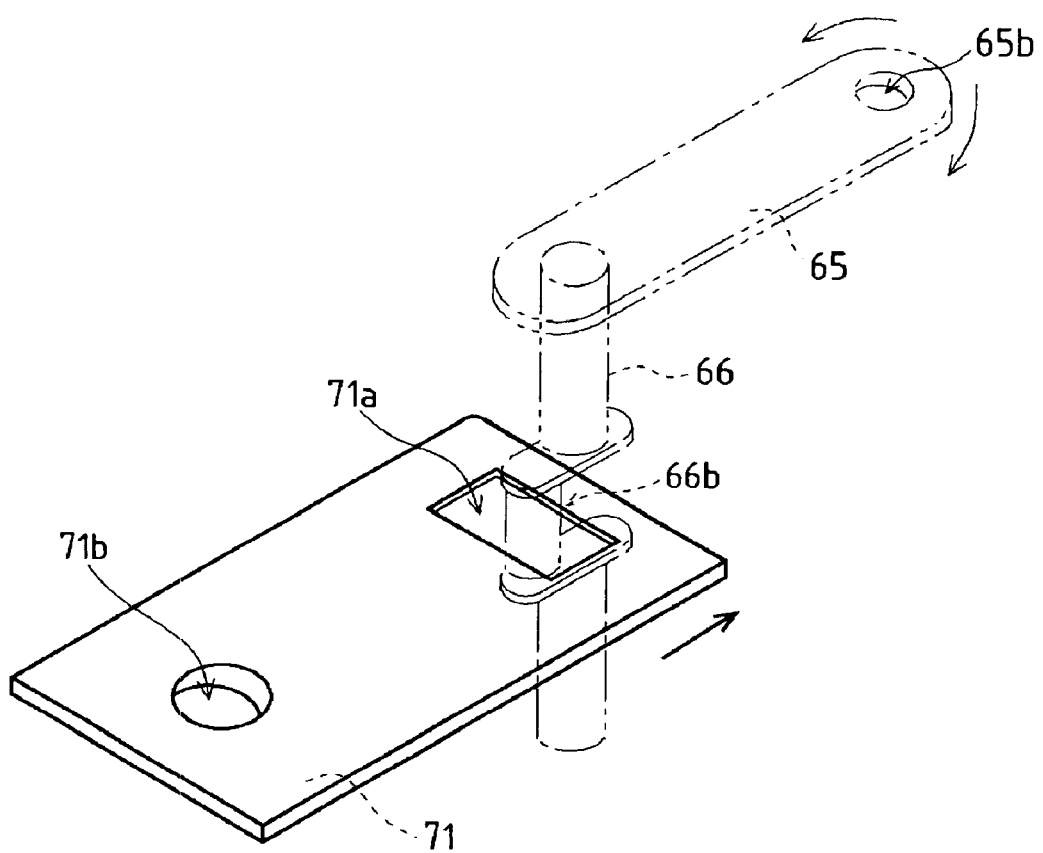
FIG. 19 is a perspective view of a motor control lever.

As shown in FIGS. 17 and 19, the motor control lever 65 is connected to the movable swash plate 44 so as to vary rotary speed of the front wheel axles 12L and 12R. Therefore, the motor control lever 65 is rotated to tilt the movable swash plate 44. The motor control lever 65 is fixed at a basal portion thereof to an upper end of a vertical lever shaft 66 rotatably supported by an upper wall of the upper housing half 46. The lever shaft 66 is extended downward and rotatably fitted at the lower end thereof in the center section 62.

A substantially horizontal plate 71 is disposed above the hydraulic motor 40 and interposed between the lever shaft 66 and the movable swash plate 44. The plate 71 is provided with a hole 71a toward the lever shaft 66, and with a hole 71b toward the movable swash plate 44. The lever shaft 66 is cranked so as to form a crank pin portion 66b, which is passed through the hole 71a in contact with an edge of the hole 71a. The hole 71a is elongated perpendicularly to the motor shaft 41 so that the crank pin portion 66b is movable therein according to rotation of the lever shaft 66. An upward projection 72 is fixed on the top of the swash plate 44 and engaged into the hole 71b of the plate 71. A hole, 65b in a tip of the motor control lever 65, as shown in FIG. 17, is used for pivotally connecting the lever 65 to the rod 24.

While the vehicle is going straight, as shown in FIGS. 17 and 18, the crank pin portion 66b of the lever shaft 66 is disposed in the middle of the hole 71a so as to hold the plate 71 at the most distant position from the lever shaft 66, thereby holding the tilt angle of movable swash plate 44 (accurately, this is an angle of the surface of the movable swash plate 44 abutting against the pistons 42 from a vertical line perpendicular to the motor shaft 41) at a minimum first degree.

As the vehicle turns, the above-mentioned linkage including the rod 24 automatically moves to rotate the motor control lever 65 and the lever shaft 66, so that the crank pin portion 66b in the hole 71a moves to one end of the hole 71a so as to pull the plate 71 toward the lever shaft 66, thereby moving the projection 72 of the movable swash plate 44 to a position drawn in phantom lines in FIG. 17, and setting the tilt angle of movable swash plate 44 to a second degree which is larger than the first degree.

Whether the motor control lever 65 is rotated back or forth from its initial position (for straight traveling of the vehicle), i.e., whether the vehicle turns left or right, the plate 71 moves toward the lever shaft 66 so as to increase the tilt angle of the movable swash plate 44 at the same rate.

Increasing the tilt angle of movable swash plate 44 causes increasing the stroke of the pistons 42 in the cylinder block 43, i.e., increasing the relative capacity of the hydraulic motor 40 to the hydraulic pump 230, thereby decelerating the front wheel axle 12. In the vehicle having the pivot from which a distance to the front wheel axle 12 is larger than the distance from the pivot to the rear wheel axle 22, the deceleration of the front wheel axle 12 results in reduction of the relative velocity of the front wheel axle 12 to the rear wheel axle 22 so as to compensate for increase of the above-mentioned ratio of distance Rr to Fr according to increase of the turning angle of the vehicle (the angle between the front wheel axle 12 and the rear wheel axle 22), whereby the vehicle turns smoothly without dragging any of the wheels 13 and 23.

Alternatively, an arrangement for interlocking connection of the movable swash plate 44 to the pivot for bending a body of an articulate vehicle may be modified so that the stroke of pistons 42, i.e., the capacity of the hydraulic motor 40 reduces so as to increase the rotary speed of the front wheel axle 12 supported by the front transaxle apparatus 10. This modified arrangement is available for ensuring smooth turning of a four-wheel-drive articulate vehicle in which the distance from the pivot to the front wheel axle 12 is smaller than the distance from the same pivot to an axle of rear wheels. In this way, by using the front transaxle apparatus 10 having the variable displacement hydraulic motor 40, any four-wheel-drive articulate vehicle is provided with the variable relative velocity between front wheels and rear wheels so as to ensure smooth turning.

As shown in FIG. 18, a pair of first and second kidney ports 62a and 62b are formed in the vertical portion of the center section 62 so as to be open in the motor mounting surface 63m. As shown in FIG. 16, a pair of horizontal port members 54a and 54b are fitted into the center section 62 and form therein with a horizontal first fluid passage 53a connected to the first kidney port 62a and a horizontal second fluid passage 53b connected to the second kidney port 62b, respectively. The port members 54a and 54b project outward from the housing so as to connect the respective fluid passages 53a and 53b to respective hydraulic fluid pipes 81a and 81b (see FIG. 15), thereby fluidly connecting the hydraulic motor 40 to the hydraulic pump 230 and the hydraulic motor 240 through the pipes 81a and 81b.

The housing is provided therein with a sump of lubricating oil also serving as hydraulic oil for the HST. As shown in FIG. 17, a port 46a is formed in an upper portion of the upper housing half 46 so as to bring the oil sump into communication with a later-discussed external reservoir tank 39 (see FIG. 22).

As shown in FIGS. 16 and 17, a drive output gear 131 is spline-fitted onto an end of the motor shaft 41 opposite to the center section 62 so as to be rotated integrally with the motor shaft 41. The drive output gear 131 is integrally formed at an end thereof opposite to the hydraulic motor 40 into a brake rotor 133 which is diametrically larger than the drive output gear 131. One brake pad 134 is disposed between a brake cam 132 and the brake rotor 133, and another brake pad 134a between the brake rotor 133 and a wall of the housing (the housing half 46 or 47) so that the brake cam 132 is actuated to sandwich the brake rotor 133 between the brake pads 134 and 134a so as to brake the rotating motor shaft 41.

A counter shaft 139 is arranged parallel to the motor shaft 41, an axially long small-diameter gear 137 is loosely fitted on the counter shaft 139, and a large-diameter gear 136 is not-rotatably relatively fitted onto a toothed side portion of the small diameter gear 137, thereby forming the reduction-gear train 135.

Regarding the reduction-gear train 135, while the large-diameter gear 136 engages with the drive output gear 131, the small-diameter gear 137 engages with a bull gear 121 of the differential gear unit 120, thereby transmitting driving force of the motor shaft 41 to the differential gear unit 120 through the reduction-gear train 135.

The differential gear unit 120 comprises the bull gear 121, a pinion 123 rotatably provided on a pinion shaft 122 supported in the bull gear 121, and a pair of side gears 124 which are fixed to the respective front wheel axles 12L and 12R and laterally engaged with the pinion 123. The front wheel axles 12L and 12R are relatively rotatably and axially inserted at proximal ends thereof into the bull gear 121. In the differential gear unit 120 having such a construction, the bull gear 121 receives the driving force from the motor shaft 41 through the reduction-gear train 135 and transmits it to the front wheel axles 12L and 12R through the pinion 123 and the side gears 124.

The differential gear unit 120 is provided with a differential-lock device 125 for locking the right and left front wheel axles 12L and 12R with each other. If the vehicle is provided with an operation lever interlocking with the differential-lock device 125, and any of the running wheels is mired, the operation lever is operated to actuate the differential-lock device 125 so as to cancel the differential rotation of the front wheel axles 12L and 12R, thereby letting the stuck vehicle escape.

As shown in FIGS. 16 and 17, an end of the motor shaft 41 opposite to the cylinder block 43 is extended outward from the housing so as to be fixedly provided thereon with a cooling fan 191 for cooling fluid collected in the front transaxle apparatus 10.

Figure 15:
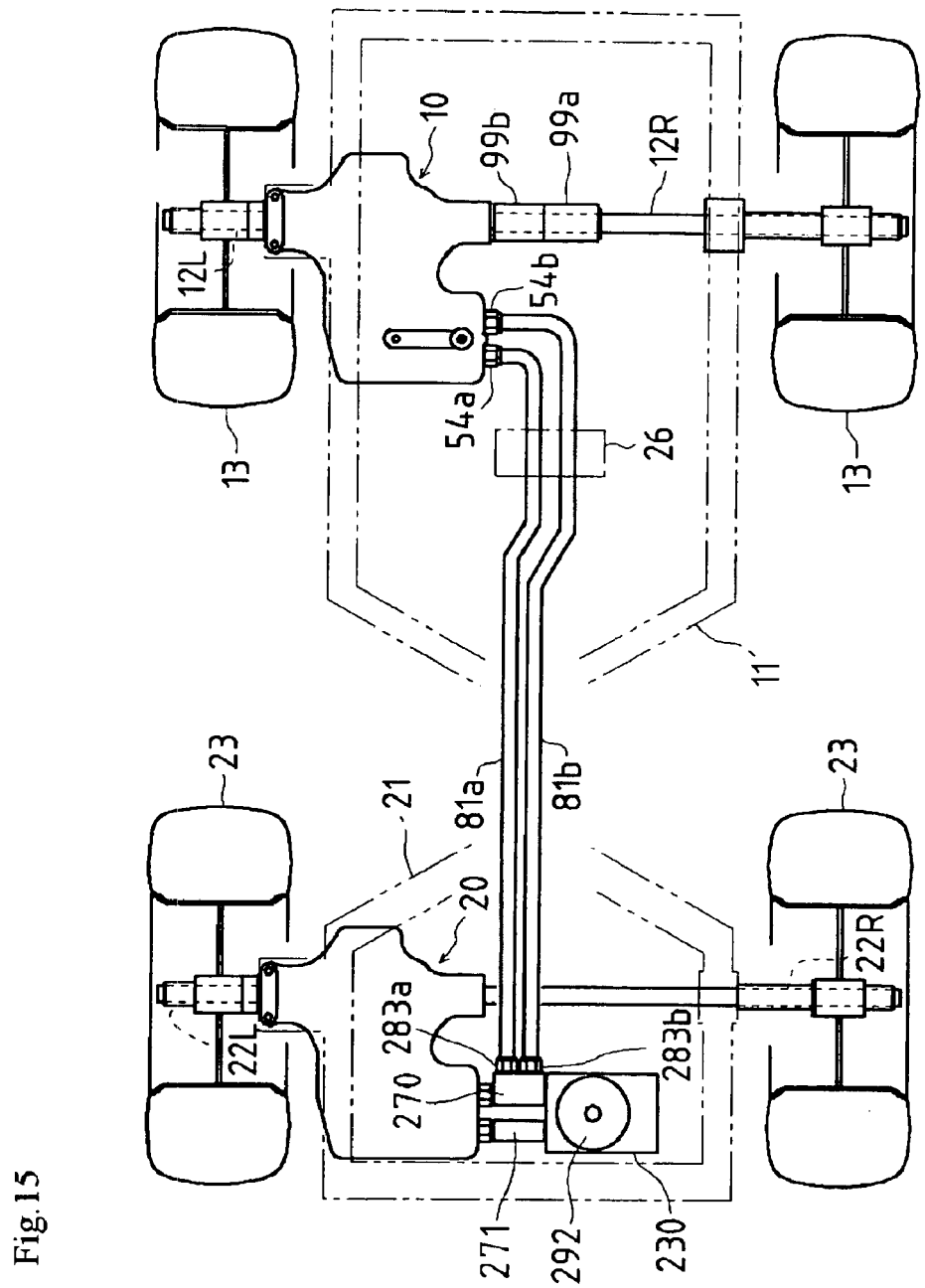
FIG. 15 is a plan view partly in section of the vehicle, showing a fluid passage structure.

As shown in FIG. 15, the hydraulic motor 40 for driving the front wheel axles 12L and 12R incorporated in the front transaxle apparatus 10 is fluidly connected through the pipes 81a and 81b to the hydraulic motor 240 for driving the rear wheel axle 22L and 22R incorporated in the rear transaxle apparatus 20.

Figure 20:
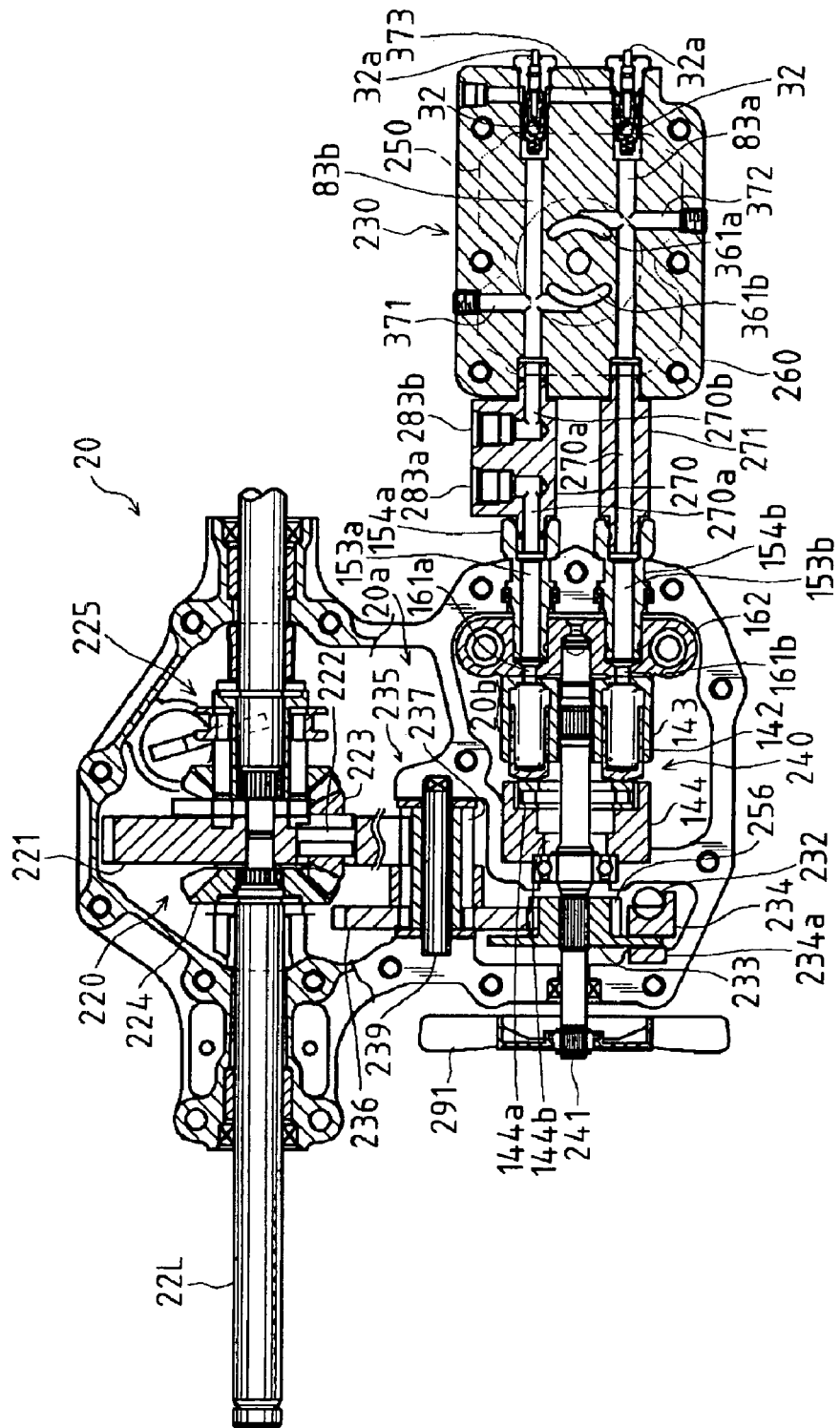
FIG. 20 is a plan view of the rear transaxle apparatus from which an upper housing half is removed.
Figure 21:
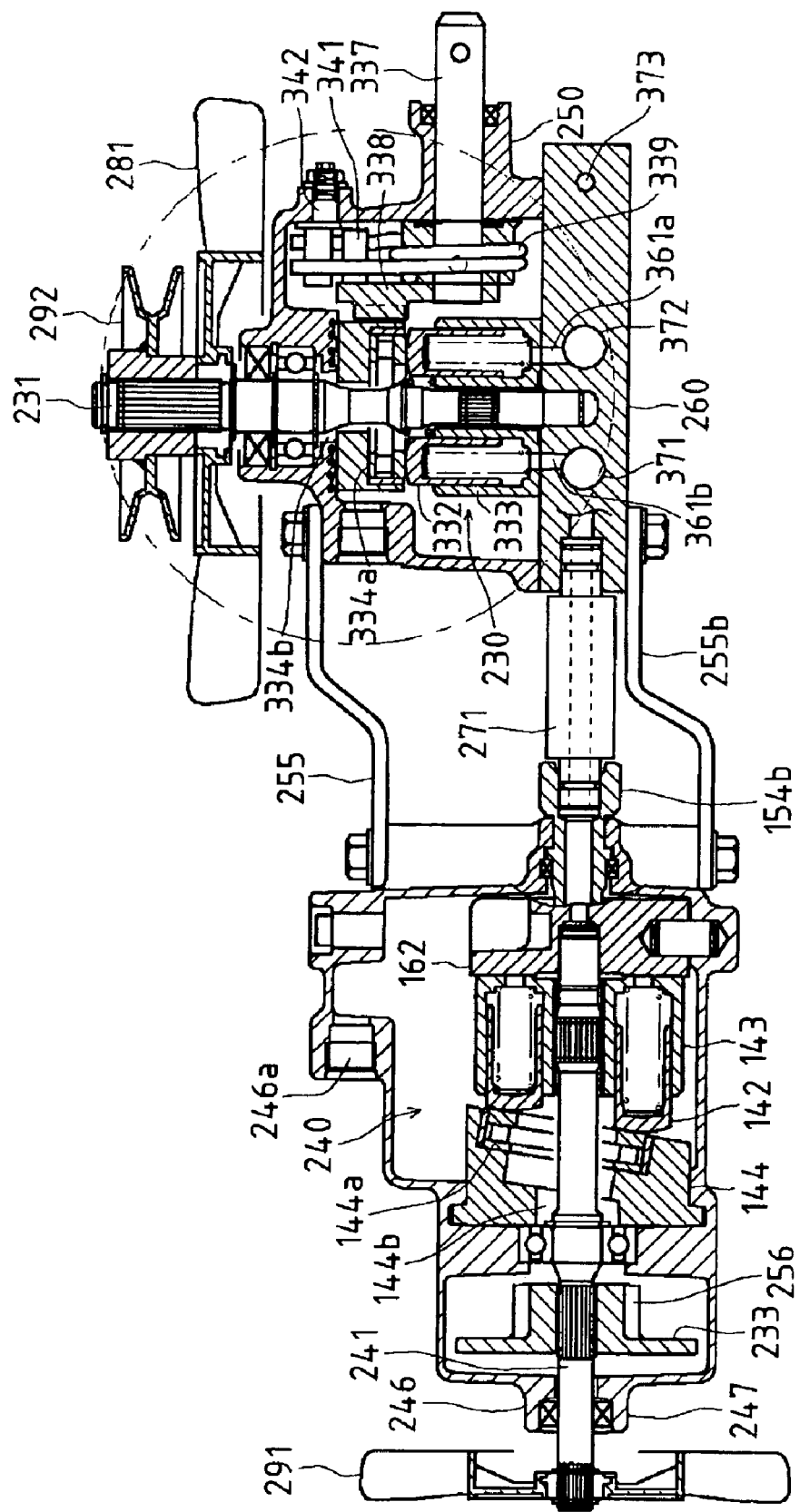
FIG. 21 is a rear view partly in section of the rear transaxle apparatus of the present invention.

Description will now be given of the rear transaxle apparatus 20. As shown in FIGS. 20 and 21, the rear transaxle apparatus 20 is formed substantially similarly with the front transaxle apparatus 10. A housing of the rear transaxle apparatus 20 comprises a housing formed by an upper housing half 246 and a lower housing half 247 vertically separably joined to each other so as to form a hollow interior into which the hydraulic motor 240 and others are incorporated. As shown in FIG. 21, a port 246a is formed in the upper portion of the upper housing half 246 so as to bring an oil sump in the housing into communication with the later-discussed external reservoir tank 39 (see FIG. 22).

The housing forms bearing portions for a later-discussed motor shaft 241 along the joint surface thereof between the upper and lower housing halves 246 and 247, thereby arranging an axis of the motor shaft 241 on the joint surface between the housing halves 246 and 247. In this embodiment, the rear wheel axles 22L and 22R are disposed in front of the motor shaft 241, differentially connected at proximal ends thereof to each other through a differential gear unit 220, and extended laterally outward from the respective left and right outside walls of the housing.

As shown in FIG. 20, the interior space of rear transaxle apparatus 20 is divided into a first chamber 20a and a second chamber 20b. A counter shaft 239 with gears of a reduction-gear train 235 thereon, the differential gear unit 220 and the rear wheel axles 22L and 22R are incorporated in the first chamber 20a. The hydraulic motor 240 is incorporated in the second chamber 20b. Driving force of the hydraulic motor 240 is transmitted to the differential gear unit 220 through the reduction-gear train 235. In this way, the rear transaxle apparatus 20 is substantially similar with the front transaxle apparatus 10, so that the housing formed of the upper and lower housing halves 46 and 47, major parts of the hydraulic motor 40, the gears and counter shaft 139 of the reduction-gear train 135, the differential gear unit 120, and the axles 12L and 12R, which are used for the front transaxle apparatus 10, may be also used for the rear transaxle apparatus 20 so as to serve as the housing formed of the upper and lower housing halves 246 and 247, the major parts of the hydraulic motor 240, the gears and counter shafts 239 of the reduction-gear train 235, the differential gear unit 220, and the axles 22L and 22R. Exclusive parts for the rear transaxle apparatus 20 are a fixed swash plate 144, which is made to be exchangeable for the movable swash plate 44, and a sealing cap which closes an opening in the upper portion of the housing so as to replace the lever shaft 66. Therefore, such common parts for the front and rear transaxle apparatuses 10 and 20 facilitate for economic product of the vehicle and for their control in stock.

The rear transaxle apparatus 20 integrally includes the hydraulic motor 240 arranged in the second chamber 20b. In the hydraulic motor 240, a cylinder block 143 is rotatable and slidably disposed on a motor mounting surface formed on a vertical portion of the center section 162. Pistons 142 are reciprocally movably fitted through respective biasing springs into a plurality of cylinder bores in the cylinder block 143. A thrust bearing 144a of the fixed swash plate 144 abuts against heads of the pistons 142. An opening 144b is provided at the center of the fixed swash plate 144 so as to allow a motor shaft 241 to pass therethrough. The fixed swash plate 144 is fixedly sandwiched between the upper housing half 246 and the lower housing half 247.

As shown in FIGS. 20 and 21, a pair of first and second kidney ports 162a and 162b are formed in the vertical portion of the center section 162 so as to be open in the motor mounting surface. A pair of horizontal port members 154a and 154b are fitted into the center section 162 and form therein with a horizontal first fluid passage 153a connected to the first kidney port 162a and a horizontal second fluid passage 153b connected to the second kidney port 162b, respectively. The port members 154a and 154b project outward from the housing so as to be connected to the respective fluid passage connectors 271 and 272.

The motor shaft 241 has a horizontal axis located on the joint surface between the upper and lower housing halves 246 and 247. The motor shaft 241 axially passes through the cylinder block 143 and is not-relatively rotatably engaged with the cylinder block 143. The motor shaft 241 is rotatably fitted at one end thereof into the center section 162. The motor shaft 241 is extended at the other end thereof from the cylinder block 162 through a sealed bearing sandwiched between the housing halves 246 and 247 so as to serve as an output shaft of the hydraulic motor 240 for outputting rotary force to the differential gear unit 220. In this way, the axial piston type fixed displacement hydraulic motor 240 is constructed in the rear transaxle apparatus 20.

As shown in FIGS. 20 and 21, the motor shaft 241 projects outward from the housing opposite to the center section 162 so as to be fixedly provided thereon with a cooling fan 291 for cooling oil collected in the rear transaxle apparatus 20. In the second chamber 20b of the housing, a drive output gear 231 is spline-fitted onto the motor shaft 241 so as to be rotated integrally with the motor shaft 241. A side portion of the drive output gear 231 opposite to the hydraulic motor 240 is integrally formed into a brake rotor 233 which is diametrically larger than the drive output gear 231. One brake pad 234 is disposed between a brake cam 232 and the brake rotor 233, and another brake pad 234a between the brake rotor 233 and a wall of the housing (the housing half 246 or 247) so that the brake cam 232 is actuated to sandwich the brake rotor 233 between the brake pads 234 and 234a so as to brake the rotating motor shaft 241.

In this embodiment, as mentioned above, a pair of brake devices including the brake rotors 133 and 233 are provided in the respective transaxle apparatuses 10 and 20, although it may be sufficient even if only one of the transaxle apparatuses 10 and 20 is provided therein with the brake device. The pair of brake devices is available for effective braking, namely, one brake device is for braking the running vehicle, and the other for a parking brake. Due to this structure, a mechanical link connecting one brake device to a normal brake pedal and a mechanical link connecting the other brake device to a parking brake lever are distributed back and forth in the vehicle so as to simplify the braking mechanism for the vehicle. Alternatively, both the front and rear brake devices may be connected to the normal brake pedal for braking the running vehicle so as to be actuated for braking simultaneously, thereby enhancing the braking effect.

A counter shaft 239 is arranged parallel to the motor shaft 241, an axially long small-diameter gear 217 is loosely fitted on the counter shaft 239, and a large-diameter gear 216 is not-relatively rotatably fitted on a tooth side of the small-diameter gear 217, thereby constituting a reduction-gear train 215. Regarding the reduction-gear train 215, the large-diameter gear 236 engages with the drive output gear 256, and the small-diameter gear 237 engages with a bull gear 221 of a differential gear unit 220, thereby transmitting the driving force from the motor shaft 241 to the differential gear unit 220 through the reduction-gear train 235.

The differential gear unit 220 comprises the bull gear 221, a pinion 223 rotatably provided on a pinion shaft 222 supported in the bull gear 221, and left and right side gears 224 fixed to the respective rear wheel axles 22L and 22R and engaged with the pinion 223. The rear wheel axles 22L and 22R are relatively rotatably and axially inserted at proximal ends thereof into the bull gear 221. In the differential gear unit 220 having such a construction, the bull gear 221 receives the driving force of the motor shaft 241 through the reduction-gear train 215 and transmits it to the rear wheel axles 22L and 22R through the pinion 223 and the side gears 224. In addition, the differential gear unit 220 is provided with a differential-lock device 225 similar with the differential-lock device 125 for the differential gear unit 120 so that the rear wheel axles 22L and 22R may be locked together at need.

Description will now be given of hydraulic pump 230 in accordance with FIGS. 20 and 21. A horizontally platy center section 260 is connected to the port members 154a and 154b projecting outward from the housing of rear transaxle apparatus 20 through fluid passage connectors 271 and 272. The center section 260 is also connected at the bottom surface thereof to the housing bottom of the rear transaxle apparatus 20 through a lower stay 255b with bolts below the fluid passage connectors 271 and 272. A pump housing 250 is mounted upright on the upper surface of the center section 260 and connected to the housing of the rear transaxle apparatus 20 through an upper stay 255a with bolts above the fluid passage connectors 271 and 272. Upper and lower stays 255a and 255b cover fluid passage connectors 271 ad 272 from the above and below.

In the pump housing 250, a cylinder block 333 is slidably rotatably mounted upright on the horizontal upper surface of the center section 260. The center section 260 is bored with a pair of kidney ports 361a and 361b downward from the upper surface thereof so as to be fluidly connected to cylinder bores in the cylinder block 333. Pistons 332 are reciprocally movably fitted through respective biasing springs into the cylinder bores in the cylinder block 333. A movable swash plate 334 is disposed above the cylinder block 333 so that a thrust bearing 334a of the movable swash plate 334 abuts against heads of the pistons 332.

The vertical pump shaft 231 axially penetrates the cylinder block 333 and is not-relatively rotatably fitted to the cylinder block 333, thereby constituting the axial piston type hydraulic pump 230. The pump shaft 231 is relatively rotatably fitted at the bottom end thereof into the center section 260. The pump shaft 231 projecting upward from the cylinder block 333 freely passes through a central opening 334b of the movable swash plate 334. Further, the pump shaft 231 is journalled by the top portion of the pump housing 250 through a bearing, and projects upwardly outward from the top of the pump housing 250 so as to be spline-fittingly provided thereon with a pump input pulley 292, thereby serving as an input shaft of the HST for receiving output power from the engine 5. A cooling fan 281 is fixed onto the pump shaft 231 between the pump input pulley 292 and the top end of the pump housing 250 so as to cool the pump housing 250 and the hydraulic pump 230 in the pump housing 250.

A motor control shaft 337 is journalled by the pump housing 250. A pump control arm 338 is fixed onto the pump control shaft 337 in the pump housing 250 and engages with a side portion of the movable swash plate 334. The pump control shaft 337 projects outward from the pump housing 250 so as to be linked to a traveling speed control operation device (not shown) such as a lever or a pedal disposed adjacent to a driver's seat on the vehicle. Due to this construction, the traveling control operation device is operated so as to rotate the pump control shaft 337, thereby changing the tilt angle of the movable swash plate 334 for controlling the direction and amount of oil discharged from the hydraulic pump 230 so as to determine the forward or backward traveling direction and speed of the traveling vehicle.

A neutral-returning spring 339 is coiled around the motor control shaft 337 so as automatically return the movable swash plate 334, when it is released from operational force, to its neutral position. Both ends of the neutral-returning spring 339 are twisted to cross each other and extend parallel in the same direction so as to nip a movable pin 341 and a fixed pin 342. The movable pin 341 is fixed to the motor control arm 338 so as to move together with the movable swash plate 334. The fixed pin 342 is screwed into a sidewall of the pump housing 250. A portion of the fixed pin 342 nipped by the spring 339 is disposed eccentrically from the other portion of the fixed pin 342 screwed into the sidewall of the pump housing 250. By rotating the screwed portion of the fixed pin 342 from the outside of the pump housing 250, the portion of the fixed pin 342 nipped by the spring 339 is revolved around the screwed portion thereof, so as to adjust the relative location of the motor control arm 338 and shaft 337 to the movable swash plate 334 in its neutral position for stopping oil discharged from the hydraulic pump 230, thereby absorbing the error of the traveling speed control operation device in location relative to the movable swash plate 334. Incidentally, in this embodiment, the mechanism for neutral-returning and neutral-adjusting the movable swash plate 334, such as the neutral-returning spring 339 and the pins 341 and 342, is provided to a portion of the control shaft 337 in the pump housing 250. Alternatively, such mechanism may be provided to the outer portion of the motor control shaft 337 out of the pump housing 250.

A pair of fluid passages 372 and 371 are bored in the center section 260 in the longitudinal direction of the rear frame 21 so as to be directly connected to the respective kidney ports 361a and 361b, and plugged at outer open ends thereof on front and rear sides of the center section 260, respectively. A pair of fluid passage 83a and 83b are bored in the center section 260 in the lateral direction of the rear frame 21 so as to perpendicularly cross the respective fluid passages 372 and 371, thereby being connected to the respective kidney ports 361a and 361b. The fluid passages 83a and 83b are connected at end portions thereof opposite to the hydraulic motor 240 through the respective check valves 73 to a charge fluid passage 373 bored in the center section 260 in parallel to the fluid passages 371 and 372. The charge fluid passage 373 is open outward from the center section 260 so as to receive oil supply for the HST. The check valves 73 allow only flow of oil from the charge fluid passage 373 to the respective fluid passages 83a and 83b. However, the check valves 73 are provided with respective pushpins 73a projecting outward from the center section 260. Each check valve 73 is forcibly opened to drain oil from the closed circuit of the HST by pressing the corresponding pushpin 73a into the center section 260. Both the pushpins 73a may be simultaneously pushed in so as to open both the check valves 73.

A fluid passage 271a penetrates the fluid passage connector 271 so as to be coaxially and continuously disposed between the fluid passage 153a in the port member 154b and the fluid passage 83a in the center section 260, thereby connecting the kidney port 361a of the hydraulic pump 230 to the kidney port 161b of the hydraulic motor 240. On the other hand, the fluid passage connector 272 is formed therein with fluid passages 272a and 272b, which are separate from each other. The fluid passage 272a is coaxially connected to the fluid passage 153a in the port member 154a, and the fluid passage 272b to the fluid passage 83b in the center section 260. The fluid passages 272a and 272b are bent at right angles and open outward at a front surface of the fluid passage connector 272 so as to serve as respective ports 283a and 283b. The ports 283a and 283b are connected to the above-mentioned fluid passages 53a and 53b of the hydraulic motor 40 through the hydraulic fluid pipes 81a and 81b, thereby forming a closed circuit of the HST, where the hydraulic motors 20 and 240 are fluidly connected in series to the hydraulic pump 230.

Figure 22:
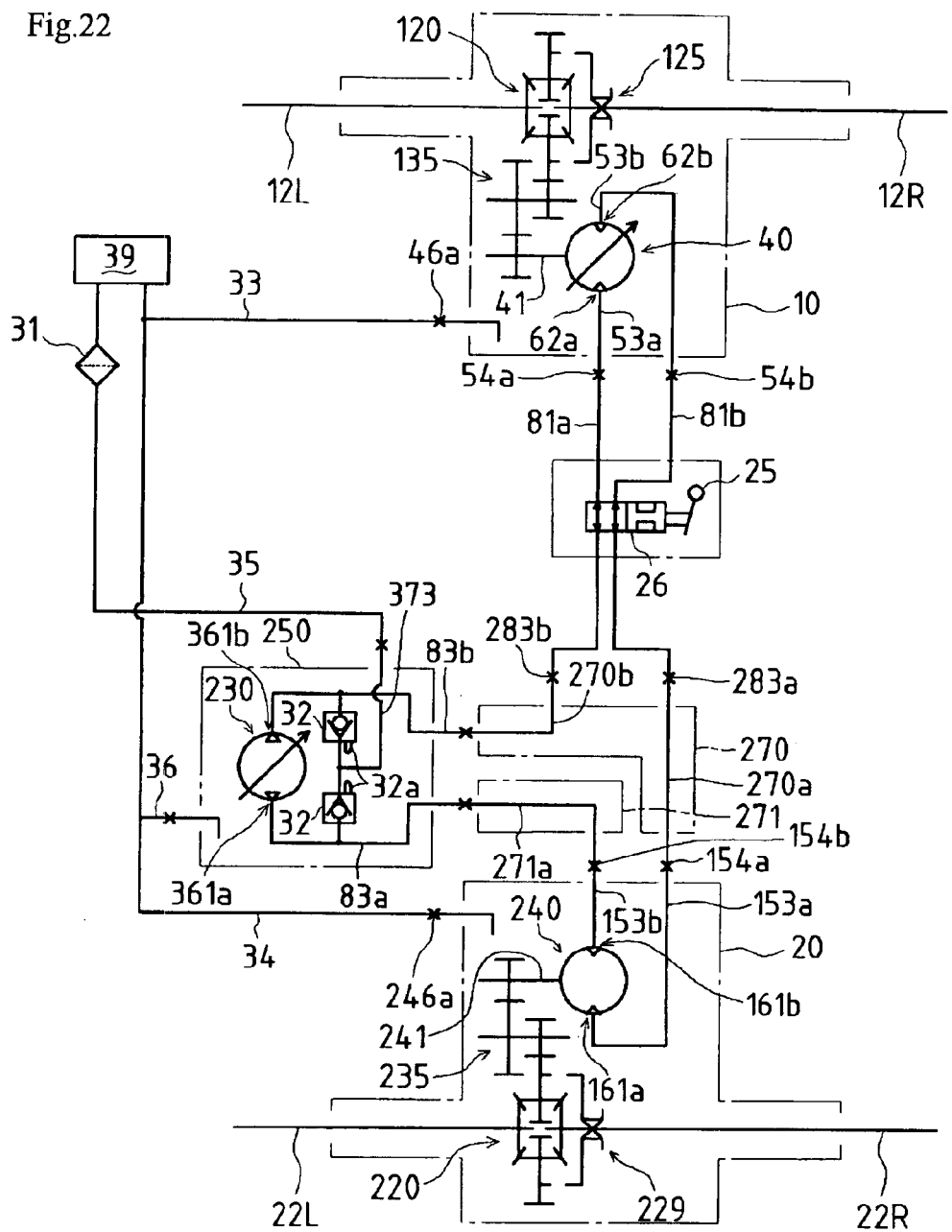
FIG. 22 is a diagram of a hydraulic circuit for driving the vehicle, wherein the variable displacement hydraulic motor of the front transaxle apparatus and a fixed displacement hydraulic motor of a rear transaxle apparatus are fluidly connected to a common hydraulic pump in series.

The HST circuit of the four-wheel-drive articulate working vehicle according to the foregoing embodiment will be now described in accordance with FIG. 22 and others.

A pair of tubes, such as rubber hoses, made of flexible and considerably pressure-proof material are preferably used for the pair of hydraulic fluid pipes 81a and 81b (see FIG. 15) interposed between the front transaxle apparatus 10 and the rear transaxle apparatus 20 (i.e., the fluid passage connector 272). Alternatively, if oil-cooling efficiency is taken into account, high-heat-conductive metallic tubes may be appreciated. In this regard, preferably, a pair of high-heat-conductive rigid tubes are extended forward from the hydraulic passage connector 270, another pair of them backward from the front transaxle apparatus 10, and a pair of soft or elastic joint tubes are disposed in the vicinity of the coupling part 50 so as to connect the pair of tubes from the hydraulic passage connector 270 to the pair of tubes from the front transaxle apparatus 10. If such metallic tubes are used, the tubes may be preferably provided on the outer periphery thereof with radiating fins so as to enhance the effect of cooling hydraulic oil. In this way, the hydraulic fluid pipes 81a and 81b shown in FIG. 15 may be provided only for the connecting ports 283a and 283b of the fluid passage connector 272 to the port members 54a and 54b of the front transaxle apparatus 10, regardless of their material, shape, and flexibility.

As shown in FIG. 22, the hydraulic fluid pipes 81a and 81b pass through a switching valve 26 on the front frame 11. A drive mode switching lever 25 is operated so as to switch the switching valve 26 between two position: one position for supplying hydraulic oil from the hydraulic pump 230 to the hydraulic motor 40 in the front transaxle apparatus 10 as well as the hydraulic motor 240 in the rear transaxle apparatus 20; and the other position for making a short cut between the hydraulic pump 230 and the hydraulic motor 240 bypassing the hydraulic motor 40. Due to this construction, the articulate working vehicle according to this embodiment travels in either a four-wheel drive mode or a two-wheel drive mode where only rear wheels 23 drive.

It is assumed that the vehicle is set to travel either forward or backward so as to make the hydraulic pump 230 discharge oil to the fluid passage 83b through the kidney port 361b. If the switching valve 26 is opened, this discharged oil is led into the fluid passage 53a in the front transaxle apparatus 10 through the fluid passage 272b and port 283b in the fluid passage connector 272 and the pipe 81a. This oil is supplied to the hydraulic motor 40 through the kidney port 62a so as to rotate the motor shaft 41, thereby driving the front wheel axle 12. The hydraulic motor 40 discharges oil to the fluid passage 53b through the kidney port 62b. Then, the oil is led to the fluid passage 153b in the rear transaxle apparatus 20 through the pipe 81b and the port 283a and passage 272a in the fluid passage connector 272. This oil is supplied to the hydraulic motor 240 through the kidney port 161a so as to rotate the motor shaft 241, thereby driving the rear wheel axle 22. The hydraulic motor 240 discharges oil to the fluid passage 153b through the kidney port 161b. This oil is led into the fluid passage 83a in the center section 260 through the fluid passage 271a in the fluid passage connector 271, and returned to the hydraulic motor 230 through the kidney port 361a. In this way, the HST according to this embodiment, hydraulic oil discharged from the hydraulic pump 230 flows the hydraulic motors 40 and 240 in tandem. If the set traveling direction of the vehicle is changed forward or backward, the flow of oil is reversed.

To the external reservoir tank 39 are extended an oil tube 33 from the port 46a formed in the housing of the front transaxle apparatus 10, and an oil tube 34 from the port 146a formed in the housing of the rear transaxle apparatus 20, thereby bringing oil in the front and rear transaxle apparatuses 10 and 20 into communication with the external reservoir tank 39. The reservoir tank 39 absorbs oil in the housings of transaxle apparatuses 10 and 20 when the oil is heated and expanded by operating the hydraulic motors 40 and 240, and feeds oil into the housings of transaxle apparatuses 10 and 20. Oil in the reservoir tank 39 is led into the charge fluid passage 373 in the center section 260 of the hydraulic pump 230 through an oil filter 31 and a hydraulic oil tube 35, and supplied as hydraulic oil into the closed circuit of the HST through the check valves 73.

The foregoing HST circuit, which connects the hydraulic motors 40 and 240 in series to the hydraulic pump 230, enables the four-wheel-drive articulate vehicle to escape miring even if the vehicle has neither differential-lock device 125 nor 225 for the front and rear differential gear units 120 and 220, thereby having an advantage in its suitability for an economical type of the four-wheel-drive articulate vehicle. It is assumed that one of the front wheels 13 is mired while differential driving of the front wheel axles 12L and 12R is kept. In the state where hydraulic oil from the hydraulic pump 230 flows to the hydraulic motor 240 for driving the rear wheel axles 22 L and 22R through the hydraulic motor 40 for driving the front wheel axles 12L and 12R, the mired front wheel 13 idles so as to reduce torque required by the hydraulic motor 40 for driving the other front wheel 13, thereby enhancing the output force of the hydraulic motor 240 for driving the rear wheels 23. Consequently, the vehicle smoothly escapes with the driving rear wheels 23.

Description will now be given of another four-wheel-drive articulate working vehicle shown in FIGS. 23 to 26 according to a third embodiment of the present invention, which includes the front and rear frames 11 and 21 having different lengths similar with the second embodiment. According to the third embodiment, a front transaxle apparatus 100 supported by the front frame 11 is provided therein with a fixed displacement hydraulic motor 240, and a rear transaxle apparatus 200 supported by the rear frame 21 with a variable displacement hydraulic motor 40. Therefore, the transaxle apparatus 20 having the fixed displacement hydraulic motor 240, which serves as a front transaxle apparatus in the second embodiment, may be diverted to the front transaxle apparatus 100 of the third embodiment, and the transaxle apparatus 10 having the variable displacement hydraulic motor 40, which serves as a rear transaxle apparatus in the second embodiment, may be diverted to the rear transaxle apparatus 200 of the third embodiment. Referring to FIGS. 23 to 26, reference numerals designate respective parts in the front and rear transaxle apparatuses 100 and 200 on the assumption that the front and rear transaxle apparatuses 10 and 20 are exchanged for each other so as to serve as the rear and front transaxle apparatuses 200 and 100, respectively, with the exception that reference numerals 12L and 12R designate front wheel axles of the front transaxle apparatus 100, and reference numerals 22L and 22R designate rear wheel axles of the rear transaxle apparatus 200.

Figure 23:
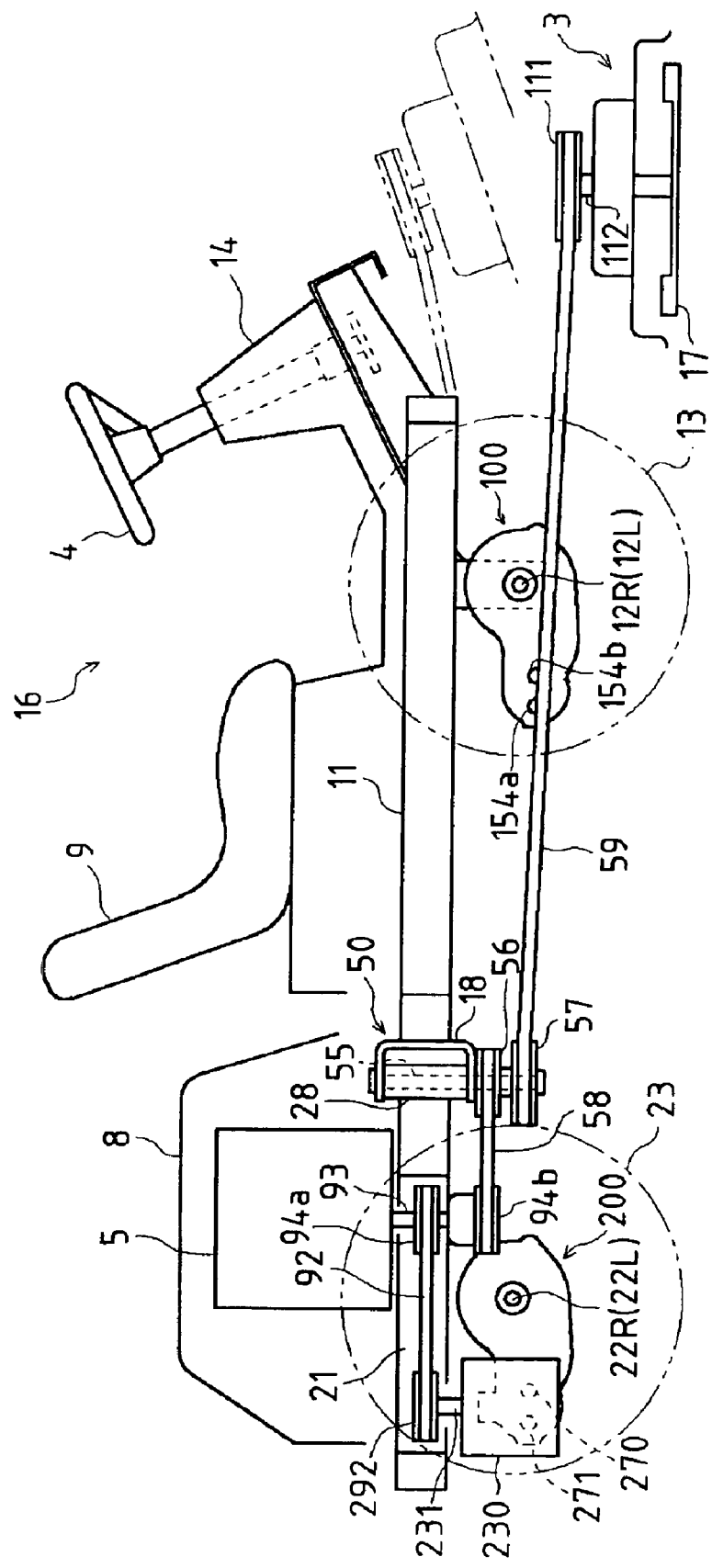
FIG. 23 is a side view of a four-wheel-drive articulate working vehicle as a third embodiment according to the present invention, wherein front and rear axles are unequally distant from a pivot connecting front and rear frames, and a hydraulic motor in a rear transaxle apparatus is variable in displacement.
Figure 24:
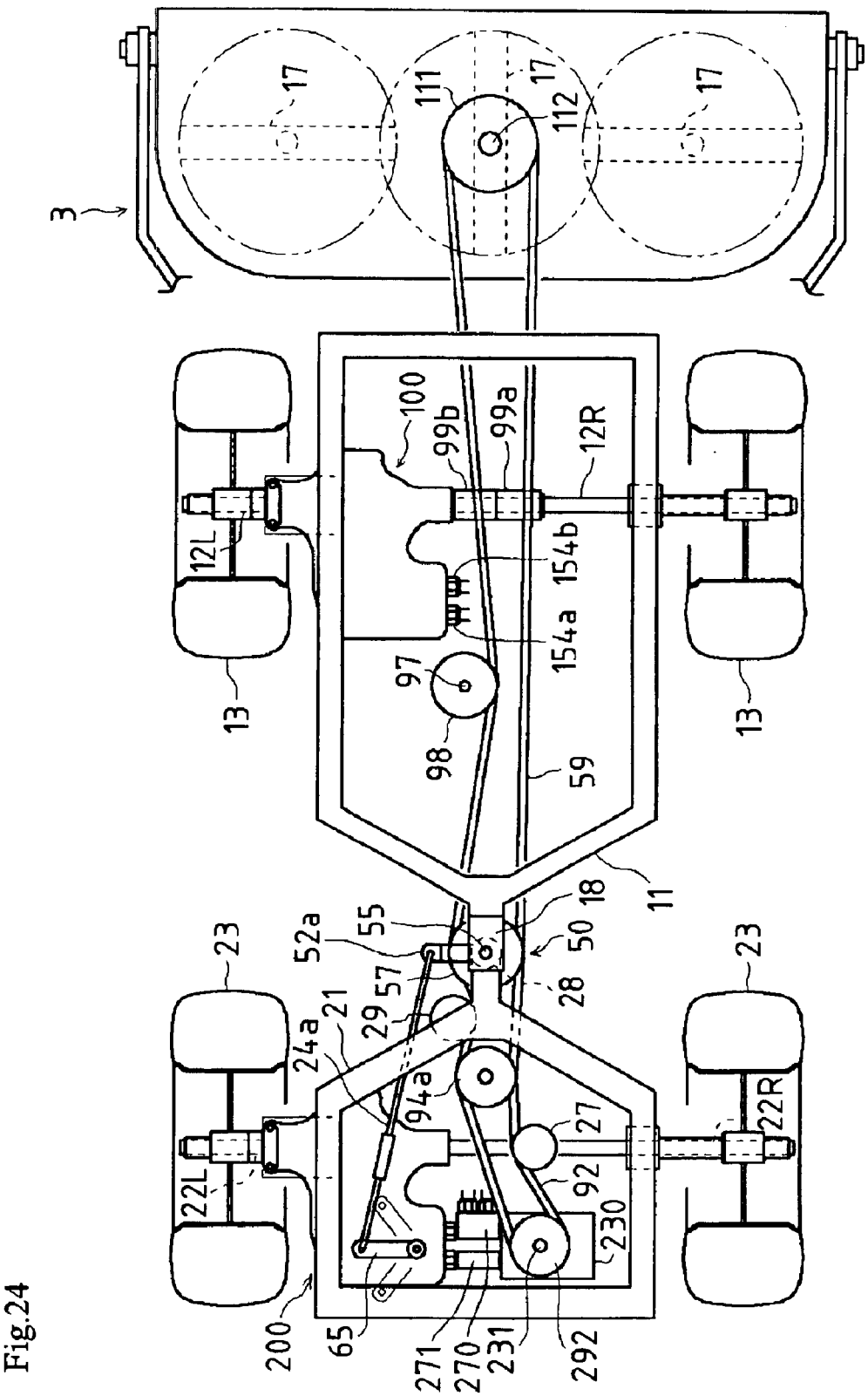
FIG. 24 is a plan view partly in section of the vehicle of FIG. 23.

In the third embodiment, as shown in FIGS. 23 and 24, the coupling part 50 is provided with a stay 52a fixed to the pivotal connector 18 on the front frame 11 side, a link rod 24a is extended backward from a tip of the stay 52a, and connected to the motor control lever 65 of the rear transaxle apparatus 200, thereby being connected the movable swash plate 44 of the variable displacement hydraulic motor 40 in the rear transaxle apparatus 200. Namely, corresponding to the bending angle of the vehicle body, the rod 24a is moved so as to steplessly change the tilt angle of the movable swash plate 44 of the variable displacement hydraulic motor 40 in the rear transaxle apparatus 200, thereby changing the relative velocity between the front wheel axle 12 (axles 12L and 12R) and the rear wheel axle 22 (axles 22L and 22R).

However, in the third embodiment, since the variable displacement transaxle apparatus 40 is provided in the rear transaxle apparatus 200 on the rear frame 21 which is shorter than the front frame 11, the capacity of the hydraulic motor 40 should be reduced so that the relative velocity of the rear wheel axle 22 to the front wheel axle 12 may increase so as to compensate for increase of the above-mentioned ratio of distance Rr/Fr according to increase of the bending angle of the vehicle body, corresponding to movement of the turning circle center 101 of the vehicle during turning of the vehicle. Therefore, in the rear transaxle apparatus 200 of this embodiment, the linkage between the lever 65 and the movable swash plate 44 is modified so that the tilt angle of the movable swash plate 44 may be reduced according to increase of the bending angle of the vehicle body, thereby ensuring smooth turning of the vehicle without dragging any of the wheels 13 and 23.

Figure 25:
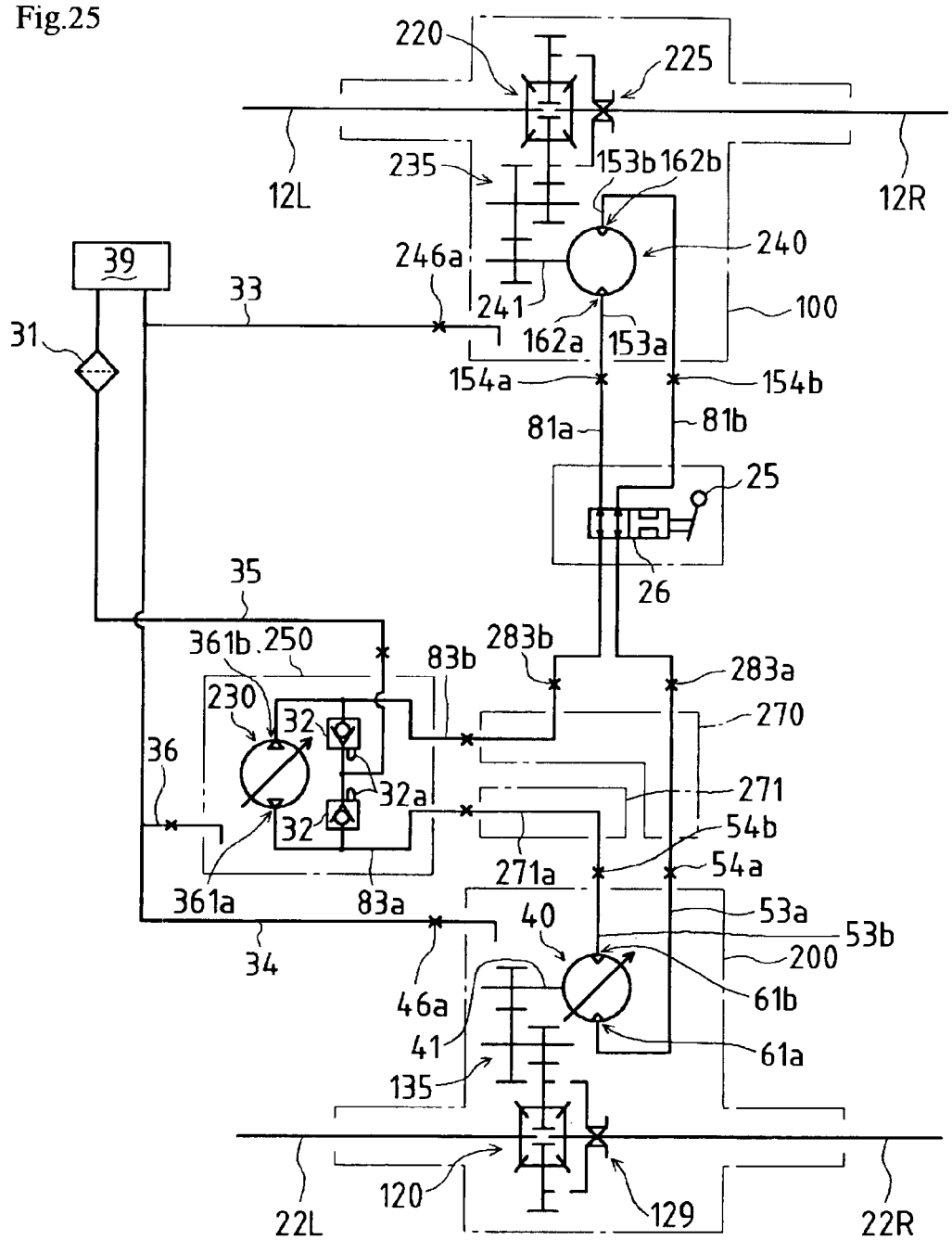
FIG. 25 is a diagram of a hydraulic circuit for driving the vehicle, wherein the variable displacement hydraulic motor of the rear transaxle apparatus and a fixed displacement hydraulic motor of the front transaxle apparatus are fluidly connected to a common hydraulic pump in series.

Moreover, as shown in FIG. 25, in the HST circuit of this embodiment, the hydraulic pump 230 driven by the engine 5 supplies hydraulic fluid to the fixed displacement hydraulic motor 240 in the front transaxle apparatus 100 through the pipe 81a, and then supplies it to the variable displacement hydraulic motor 40 in the rear transaxle apparatus 200 through the pipe 81b. Alternatively, the oil-flow may be opposite. The oil-flow direction in the HST circuit is reversible for selecting the forward or backward traveling direction of the vehicle. The vehicle of the third embodiment having the HST circuit, where the hydraulic motor 240 in the front transaxle apparatus 100 and the hydraulic motor 40 in the rear transaxle apparatus 200 are fluidly connected in series to the hydraulic pump 230, is advantageous in escaping miring, similarly with the vehicle of the second embodiment.

Figure 26:
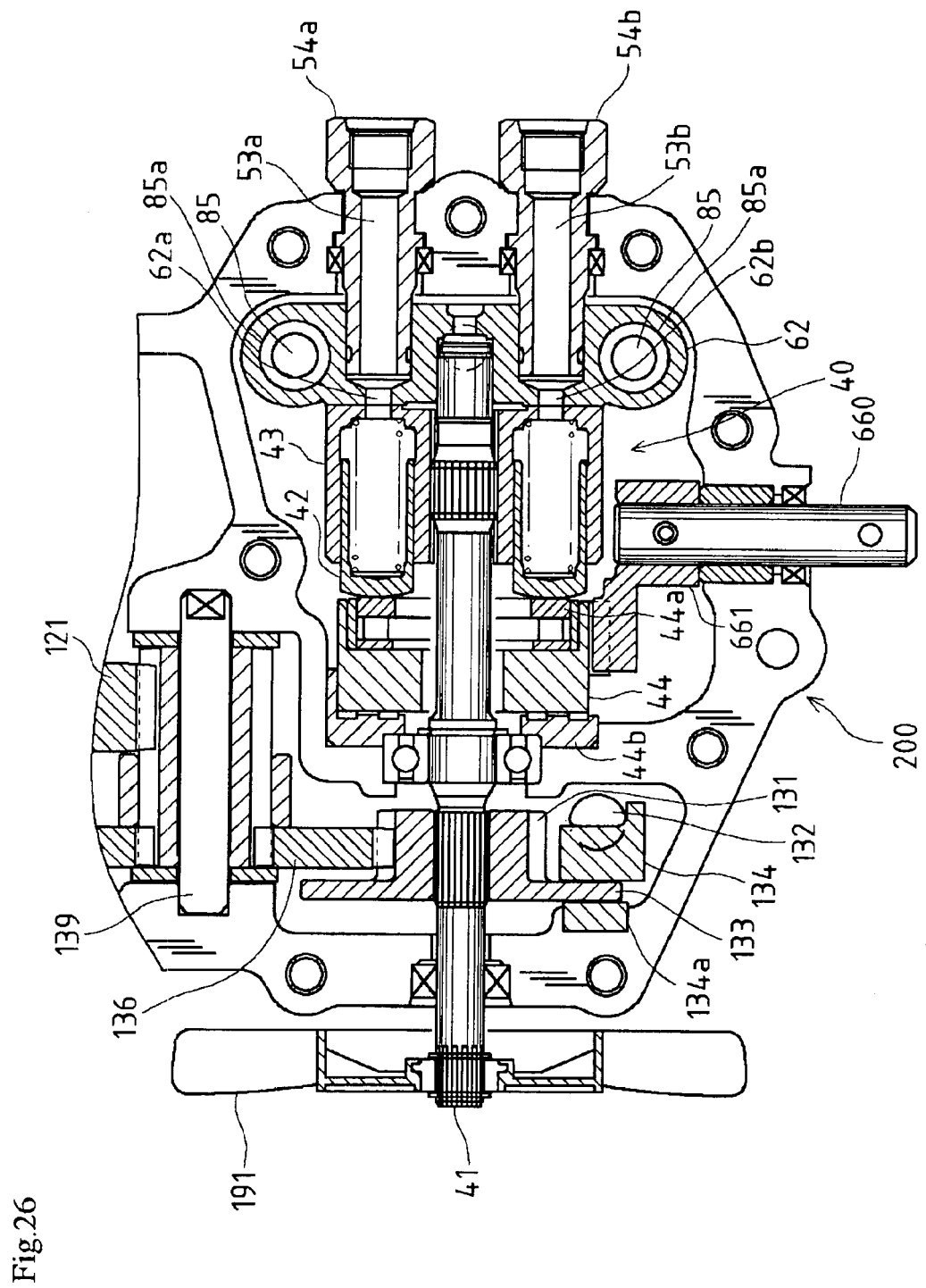
FIG. 26 is a fragmentary plan view of a modified transaxle apparatus, from which an upper housing half is removed.

Alternatively, either the front transaxle apparatus 10 of the second embodiment or the rear transaxle apparatus 200 of the third embodiment may be provided therein with a modified mechanism for changing the tilt angle of the movable swash plate 44 of the variable displacement hydraulic motor 40 as shown in FIG. 26. In this mechanism, a horizontally axial lever shaft 660 linked with the movable swash plate 44 through an arm 661 is supported by the housing. The motor control lever 65 is fixed onto an outer end of the lever shaft 660 projecting outward from the housing. Therefore, the motor control lever 65 rotates vertically. A mechanical link may be interlockingly connected to the steering wheel 4 so as to operate this lever 65. In this case, since the link is pushed and pulled in a substantially horizontal direction perpendicular to the vertical rotational direction of the lever 65, a bell crank is required for converting the operational direction of the link.

Alternatively, this vertically rotatable lever 65 may be connected to an electric/hydraulic actuator which is telescoped according to detection of a rotational degree of the steering wheel 4 or a relative angle of the front and rear frames 11 and 21. Corresponding to an initial position of the electric/hydraulic actuator, an initial tilt position of the movable swash plate 44 is decided, and a tilt angle of the movable swash plate 44 is changed according to the operation of the electric/hydraulic actuator.

Figure 27:
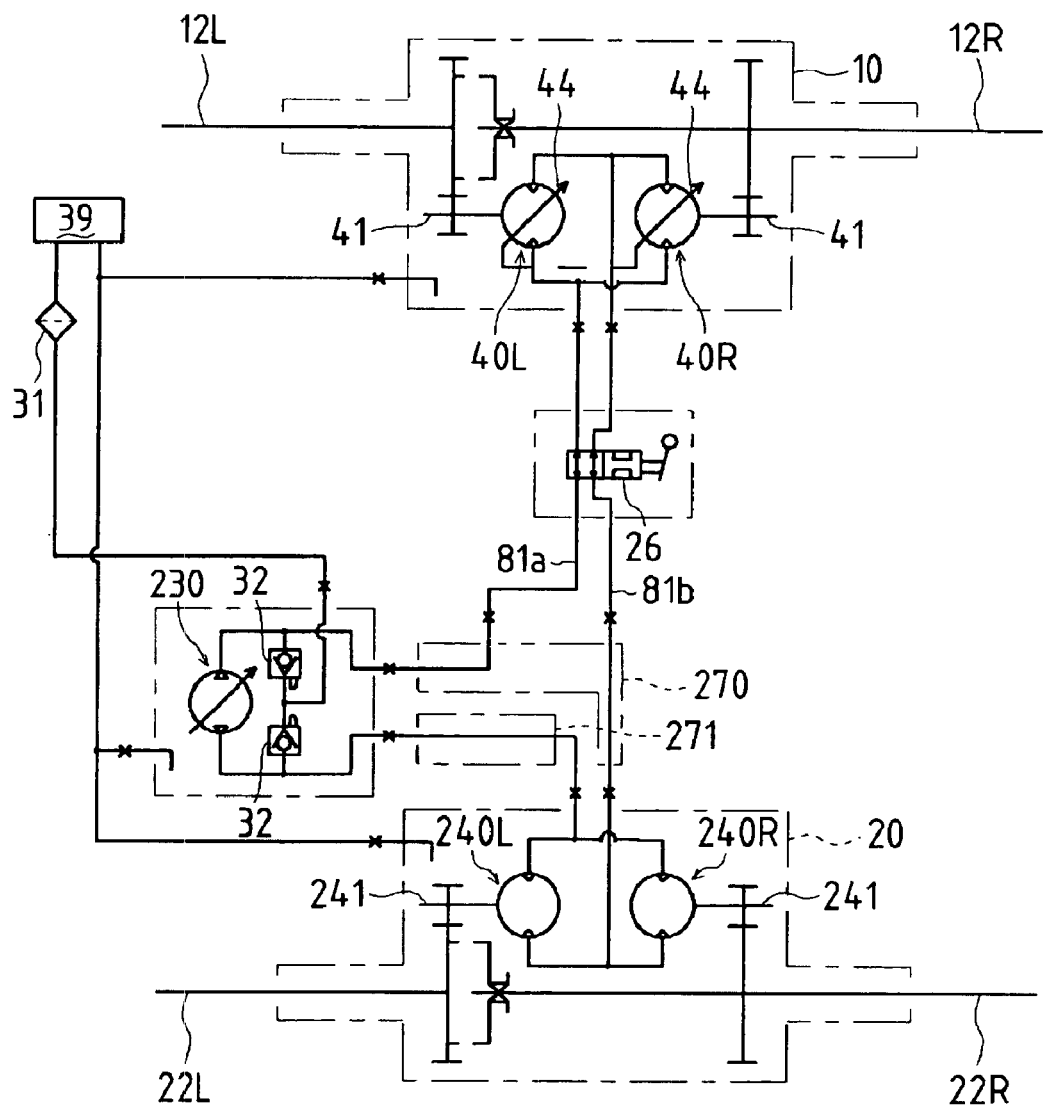
FIG. 27 is a diagram of a hydraulic circuit for a four-wheel-drive vehicle provided with a pair of front and rear hydraulic differential units, each of which includes a pair of hydraulic motors for driving respective left and right axles.

Alternatively, as shown in FIG. 27, in the front transaxle apparatus 10 according to the second embodiment, a hydraulic differential unit replacing the above-mentioned mechanical differential gear unit 120 may be constructed such that a pair of variable displacement hydraulic motors 40L and 40R are drivingly connected to the respective front wheel axles 12L and 12R, and fluidly connected to each other. In this case, the movable swash plates 44 of the hydraulic motors 40L and 40R are mechanically connected mutually and then connected to the steering wheel 4 in the above-mentioned way. Similarly, in the rear transaxle apparatus 20 according to the second embodiment, a hydraulic differential unit replacing the above-mentioned mechanical differential gear unit 220 may be constructed such that a pair of fixed displacement hydraulic motors 240L and 240R are drivingly connected to the respective rear wheel axles 22L and 22R, and fluidly connected to each other.

Such hydraulic differential units replacing the mechanical differential gear units, each of which is provided with the pair of hydraulic motors for driving the respective left and right axles, may be also applicable to the third embodiment shown in FIGS. 23 to 25. In this regard, the front transaxle apparatus 100 is provided with a pair of fixed displacement hydraulic motors 240 for driving the respective front wheel axles 12L and 12R, and the rear transaxle apparatus 200 with a pair of variable displacement hydraulic motors 40 for driving the respective rear wheel axles 22L and 22R. Accordingly, the interchangeability between the front and rear transaxle apparatuses is ensured even if they are provided with the hydraulic differential units. Alternatively, one of the front and rear transaxle apparatuses may be provided with a mechanical differential gear unit combined with a single hydraulic motors, and the other with a hydraulic differential unit having a pair of hydraulic motors.

Further alternatively, both the front and rear transaxle apparatuses may be provided with variable displacement hydraulic motors, if such a construction is desirable for improving turning performance of the vehicle. In this regard, each transaxle apparatus may be selectively provided with either a mechanical differential gear unit combined with a single variable displacement hydraulic motor or a hydraulic differential unit having a pair of variable displacement hydraulic motors.

As many apparently widely different embodiments of this invention may be made without departing from the spirit and scope thereof, it is to be understood that the invention is not limited to the specific embodiments thereof except as defined in the appended claims.

What is claimed is:

1. A four-wheel-drive articulate vehicle, comprising:
   a pair of pivotally connected first and second frames;
   a first axle supported by said first frame;
   a second axle supported by said second frame;
   a pivot connecting said first and second frames to each other so that said vehicle turns by relative rotation of said first frame to said second frame around said pivot, said first and second axles being unequally distant from said pivot; and
   means for transmitting power to said first and second axles, whereby a relative velocity between said first and second axle steplessly varies corresponding to variation of a distance ratio between said first and second axles from a turning circle center of said vehicle.

2. The four-wheel-drive articulate vehicle as set forth in claim 1, further comprising:
   a variable displacement pump disposed on said first frame;
   a first hydraulic motor for driving said first axle disposed on said first frame so as to be fluidly connected to said hydraulic pump; and
   a second hydraulic motor for driving said second axle disposed on said second frame so as to be fluidly connected to said hydraulic pump, wherein at least one of said first and second hydraulic motors is a variable displacement hydraulic motor, whose volume automatically varies according to variation of a turning angle of said vehicle.

3. The four-wheel-drive articulate vehicle as set forth in claim 2, further comprising:
   a first transaxle apparatus with said first axle mounted on said first frame, said first transaxle apparatus being integrally provided with said first hydraulic motor; and
   a second transaxle apparatus with said second axle mounted on said second frame, said second transaxle apparatus being integrally provided with said second hydraulic motor, wherein said hydraulic pump is disposed separately from said first and second transaxle apparatuses and supported by either said first or second frame supporting an engine.

4. The four-wheel-drive articulate vehicle as set forth in claim 3, wherein said first hydraulic motor is disposed in said first transaxie apparatus, wherein said second hydraulic motor is disposed in said second transaxie apparatus, wherein said first transaxie apparatus is similar in shape with said second transaxle apparatus, and wherein said hydraulic pump is supported by either the first or second transaxle apparatuses on said first or second frame supporting said engine.

5. The four-wheel-drive articulate vehicle as set forth in claim 2, further comprising:

a hydraulic series circuit constructed such that hydraulic fluid flows from said hydraulic pump to one of said first and second hydraulic motors through the other first or second hydraulic motor, and returns to said hydraulic pump.

6. The four-wheel-drive articulate vehicle as set forth in claim 2, wherein said hydraulic pump is integrally connected to one of said first and second motors.

7. The four-wheel-drive articulate vehicle as set forth in claim 2, wherein said hydraulic pump is a common fluid source for said first and second hydraulic motors.

8. The four-wheel-drive articulate vehicle as set forth in claim 2, further comprising:

a pair of axles serving as at least one of said first and second axles; and a mechanical differential gear unit for differentially connecting said pair of axles to each other, wherein output of said corresponding hydraulic motor is transmitted to said mechanical differential gear unit.

9. The four-wheel-drive articulate vehicle as set forth in claim 2, further comprising:

dual axles serving as either said first axle or said second axle; and dual hydraulic motor serving as said first or second hydraulic motor for driving said respective dual axles, wherein said dual hydraulic motors are fluidly connected to each other so as to differentially connecting said dual axles to each other.

10. The four-wheel-drive articulate vehicle as set forth in claim 1, further comprising:

a hydraulic fluid tube for connecting said hydraulic pump and said first and second hydraulic motors, wherein said hydraulic fluid tube partly includes a metallic tube.

* * * * *